(12) United States Patent
Hu et al.

(10) Patent No.: US 11,360,284 B2
(45) Date of Patent: Jun. 14, 2022

(54) DRIVING MECHANISM FOR OPTICAL ELEMENT

(71) Applicant: TDK TAIWAN CORP., Taoyuan (TW)

(72) Inventors: Chao-Chang Hu, Taoyuan (TW); Sung-Mao Tsai, Taoyuan (TW); Chia-Che Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 148 days.

(21) Appl. No.: 16/844,206

(22) Filed: Apr. 9, 2020

(65) Prior Publication Data

US 2020/0393636 A1 Dec. 17, 2020

Related U.S. Application Data

(60) Provisional application No. 62/861,440, filed on Jun. 14, 2019.

(30) Foreign Application Priority Data

Feb. 3, 2020 (CN) .......................... 202020150619.1

(51) Int. Cl.
*G02B 7/04* (2021.01)
*G02B 7/00* (2021.01)
*H04N 5/232* (2006.01)
*G03B 5/04* (2021.01)
*G02B 27/64* (2006.01)
*H02K 11/21* (2016.01)
(Continued)

(52) U.S. Cl.
CPC .............. *G02B 7/005* (2013.01); *G02B 7/04* (2013.01); *G02B 7/09* (2013.01); *G02B 26/02* (2013.01); *G02B 27/646* (2013.01); *G03B 5/04* (2013.01); *G03B 13/36* (2013.01); *H02K 11/21* (2016.01); *H04N 5/2252* (2013.01); *H04N 5/2254* (2013.01); *H04N 5/2257* (2013.01); *H04N 5/232* (2013.01); *G03B 2205/0053* (2013.01); *G03B 2205/0069* (2013.01)

(58) Field of Classification Search
CPC ...... G02B 26/02; G02B 27/646; G02B 7/005; G02B 7/04; G02B 7/09; G02B 7/00; G03B 5/04; G03B 13/36; G03B 13/34; G03B 13/32; G03B 2205/0053; G03B 2205/0069; H02K 11/21; H04N 5/2252; H04N 5/2254; H04N 5/2257; H04N 5/232
USPC ........................................................ 359/288
See application file for complete search history.

(56) References Cited

U.S. PATENT DOCUMENTS 10,935,752 B2 * 3/2021 Lee ...................... G02B 27/646
2018/0329277 A1 * 11/2018 Han ....................... G02B 27/64
(Continued)

*Primary Examiner* — William R Alexander
(74) *Attorney, Agent, or Firm* — Muncy, Geissler, Olds & Lowe, P.C.

(57) ABSTRACT

An optical element driving mechanism is provided. The optical element driving mechanism includes a movable portion, a fixed portion, a driving assembly, and a support element. The movable portion is used for connecting to an optical element having a main axis. The movable portion is movable relative to the fixed portion. The driving assembly is disposed on the fixed portion or the movable portion. The driving assembly is used to drive the movable portion to move relative to the fixed portion. The movable portion is connected to the fixed portion through the support element.

18 Claims, 23 Drawing Sheets

(51) Int. Cl.
    *G02B 7/09*     (2021.01)
    *H04N 5/225*     (2006.01)
    *G02B 26/02*     (2006.01)
    *G03B 13/36*     (2021.01)

(56) References Cited

U.S. PATENT DOCUMENTS

| | | | |
|---|---|---|---|
| 2020/0026026 A1* | 1/2020 | Park | H02P 1/00 |
| 2020/0049939 A1* | 2/2020 | Lee | G02B 27/646 |
| 2020/0106940 A1* | 4/2020 | Park | H04N 5/2254 |
| 2021/0112186 A1* | 4/2021 | Park | G02B 7/08 |
| 2021/0294067 A1* | 9/2021 | Park | G02B 7/09 |

\* cited by examiner

DRIVING MECHANISM FOR OPTICAL ELEMENT

CROSS REFERENCE TO RELATED APPLICATIONS

This application claims the benefit of U.S. Provisional Application No. 62/861,440, filed on Jun. 14, 2019, and China Patent Applications No. 202020150619.1, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided, includes a movable portion, a fixed portion, a driving assembly, and a support element. The movable portion is used for connecting to an optical element having a main axis. The movable portion is movable relative to the fixed portion. The driving assembly is disposed on the fixed portion or the movable portion, and is used to drive the movable portion to move relative to the fixed portion. The movable portion is connected to the fixed portion through the support element.

In some embodiments, the driving assembly includes a first magnetic element disposed on the movable portion and a second magnetic element disposed on the fixed portion, wherein the first magnetic element and the second magnetic element at least partially overlap each other when viewed in a direction that is perpendicular to the main axis. In some embodiments, the optical element driving mechanism further includes a circuit board, and the second magnetic element is disposed on the circuit board. In some embodiments, the circuit board and the first magnetic element are separated from each other by a distance.

In some embodiments, the optical element driving mechanism further includes a position sensor, wherein the driving assembly and the position sensor are positioned on opposite sides of the circuit board. In some embodiments, the fixed portion includes a base, the base has an opening, and the position sensor is disposed in the opening. In some embodiments, the thickness of the position sensor is less than the thickness of the base along the main axis. In some embodiments, the circuit board includes magnetic permeable material. In some embodiments, the optical element driving mechanism further includes a resilient element, wherein the circuit board and the resilient element are disposed on different sides of the fixed portion. In some embodiments, the resilient element is positioned on a plane, and the normal vector of the plane is parallel to the main axis.

In some embodiments, the optical element driving mechanism further includes a magnetic permeable element, wherein the fixed portion includes a base, and the magnetic permeable element is embedded in the base. In some embodiments, the optical element driving mechanism further includes a circuit electrically connected to the driving assembly, wherein the fixed portion includes a base, and the circuit is embedded in the base. In some embodiments, the material of the support element includes ceramic or resin. In some embodiments, the fixed portion includes a base, wherein the base includes a convex portion extending to the movable portion, the support element has a spherical shape, and the minimum distance between the convex portion and the fixed portion is less than the diameter of the support element along the main axis.

In some embodiments, fixed portion includes a base having a rectangular shape, and a stopping portion extending to the movable portion. The stopping portion is positioned at a corner of the base. In some embodiments, the driving assembly includes a first magnetic element and a second magnetic element, wherein the minimum distance between the stopping portion and the movable portion is less than the minimum distance between the first magnetic element and the second magnetic element along the main axis. In some embodiments, the optical element driving mechanism has a rectangular shape, and the driving assembly is disposed at a side of the optical element driving mechanism. In some embodiments, the fixed portion includes a base having a rectangular shape, and a stopping portion extending to the movable portion. The stopping portion is positioned at a corner of the base or the side of the base. In some embodiments, the optical element driving mechanism has a rectangular shape, and the driving assembly is disposed at a corner of the optical element driving mechanism. In some embodiments the fixed portion includes a base having a rectangular shape, and a stopping portion extending to the movable portion. The stopping portion is positioned at the corner of the base or a side of the base.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
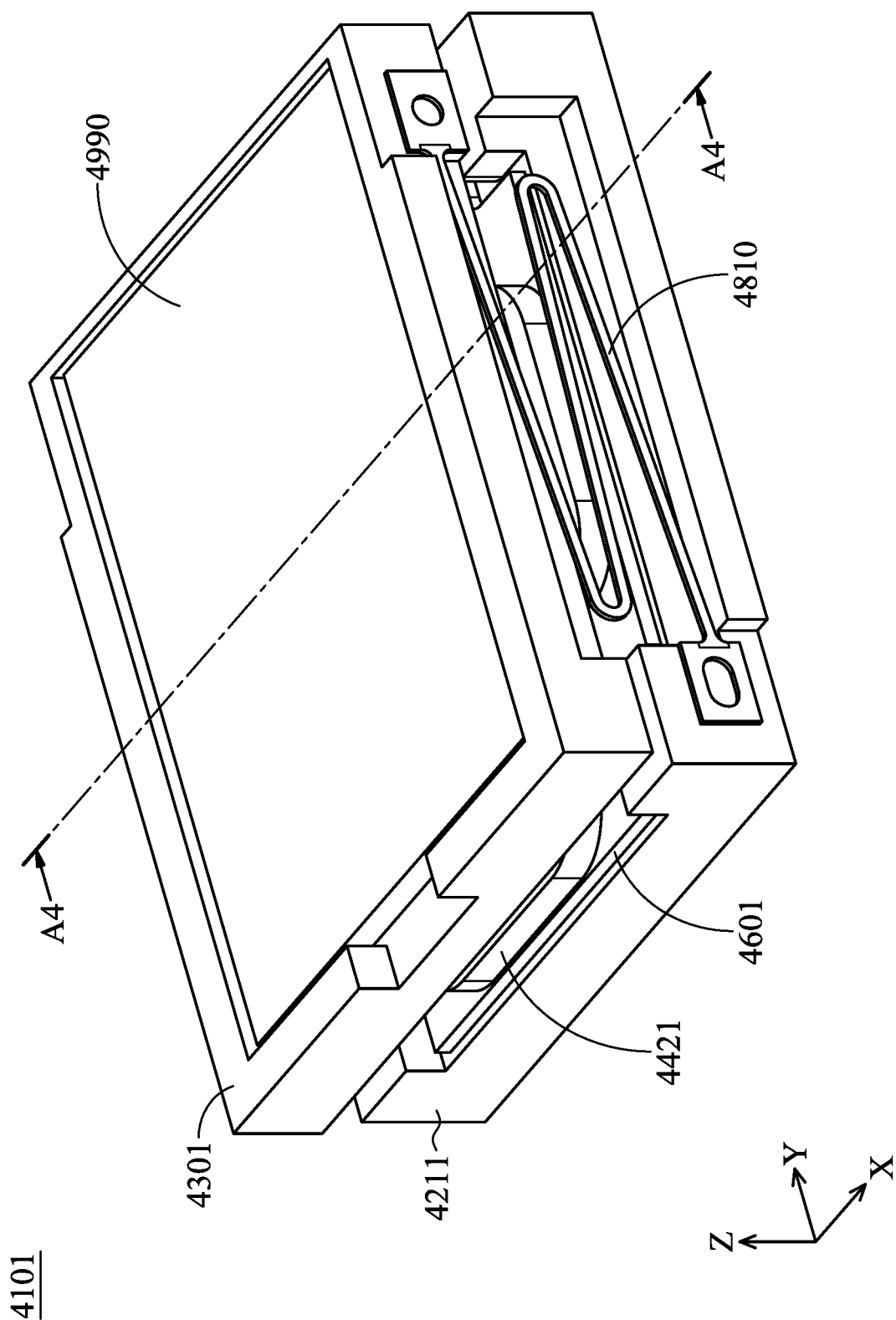
FIG. 1 is a perspective view of an optical element driving mechanism according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
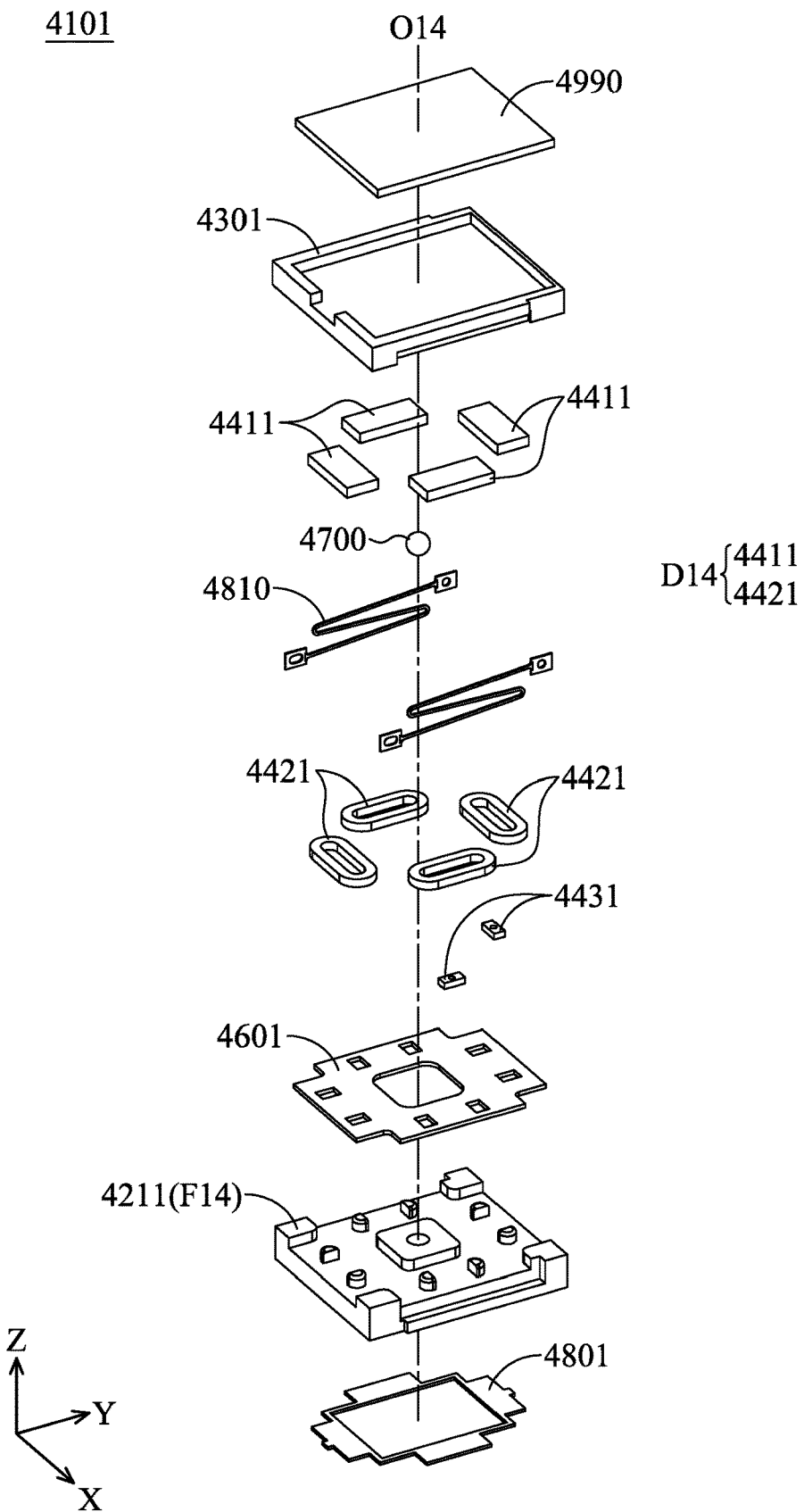
FIG. 2 is an exploded view of the optical element driving mechanism.

In some embodiments of the present disclosure, FIG. 1 to FIG. 5 are a perspective view and an exploded view of an optical element driving mechanism 4101, and a cross-sectional view illustrated along a line A4-A4 in FIG. 1, a schematic view and a side view of some elements of the optical element driving mechanism 4101, respectively. In FIG. 2, the optical element driving mechanism 4101 mainly includes, a base 4211 (or called as a fixed portion F14), a movable portion 4301, a first magnetic element 4411, a second magnetic element 4421, a position sensor 4431, a circuit board 4601, a support element 4701, a magnetic permeable element 4801, and a resilient element 4811. The optical element driving mechanism 4101 may be used for driving an optical module 4990, or it may be used for driving various optical elements, such as a lens, a mirror, a prism, a beam splitter, or an aperture.

In some embodiments, the first magnetic element 4411 and the second magnetic element 4421 may be called as a driving assembly D14 to drive the movable portion 4301 moving relative to the fixed portion F14. For example, the first magnetic element 4411 and the second magnetic element 4421 may include a combination of a driving coil and a driving magnet. For example, the first magnetic element 4411 may be a driving magnet, and the second magnetic element 4421 may be a driving coil. In another example, the first magnetic element 4411 may be a coil, and the second magnetic element 4421 may be a driving magnet, and is not limited thereto. The first magnetic element 4411 and the second magnetic element 4421 may be positioned on the fixed portion F14 and the movable portion 4301, respectively. In some embodiments, the positions of the fixed portion F14 and the movable portion 4301 may be interchanged. As a result, the movable portion 4301 may be driven by the driving assembly D14 to move relative to the fixed portion F14, and the optical module 4990 disposed on the movable portion 4301 may move with the movable portion 4301 to achieve auto focus (AF) or optical image stabilization (OIS). In some embodiments, the optical element driving mechanism 4101 may has a rectangular shape, and the driving assembly D14 may be disposed on the sides or the corners of the optical element driving mechanism 4101. In some embodiments, the driving assembly D14 may include other driving elements, such as piezoelectric elements, shape memory alloys, etc.

Figure 3:
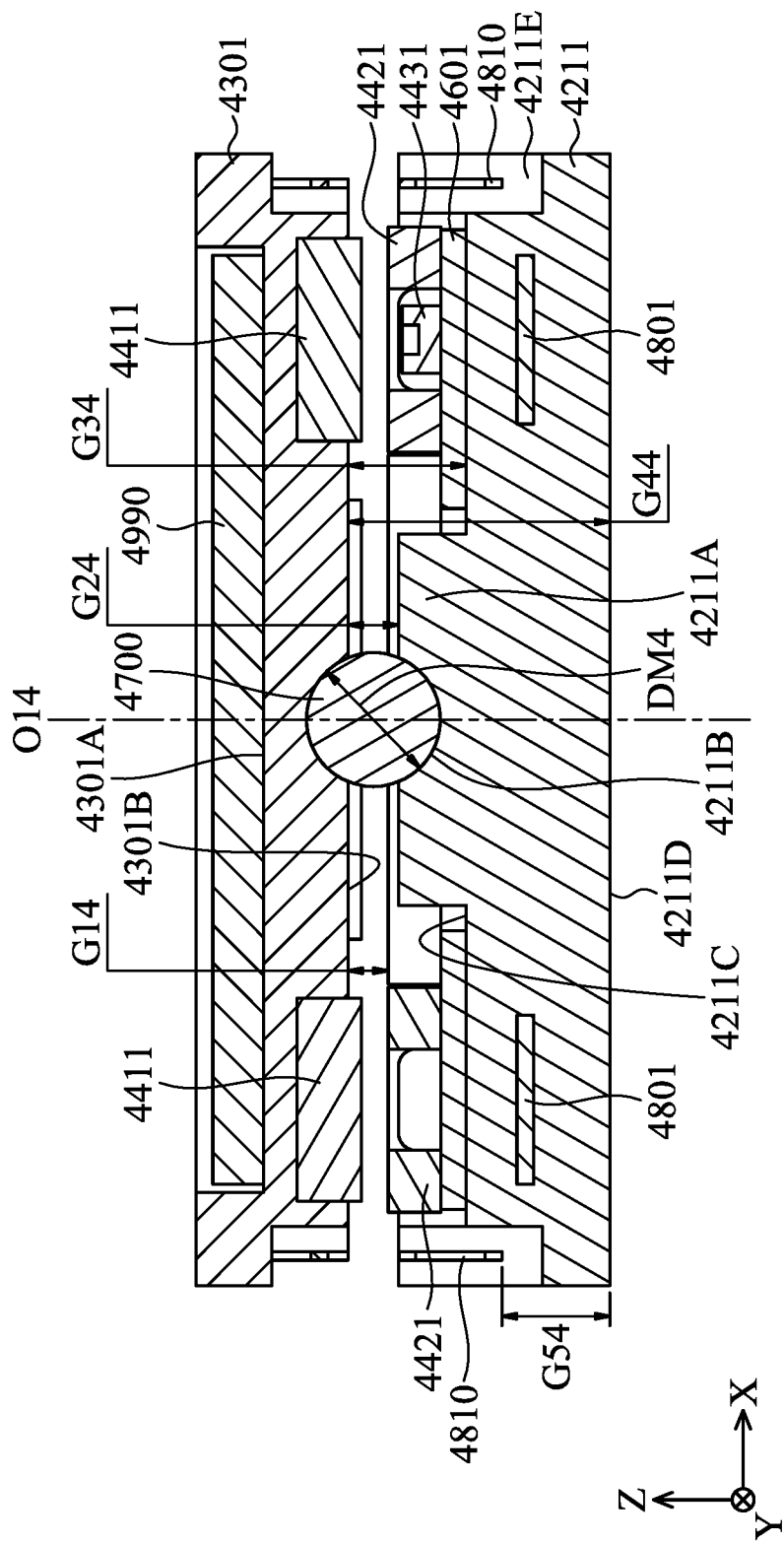
FIG. 3 is a cross-sectional view of the optical element driving mechanism.

In some embodiments, the first magnetic element 4411 may extend in a direction that is perpendicular to the main axis O14, such as along X axis or Y axis, to allow the movable portion 4301 rotate relative to X axis or Y axis. In some embodiments, as shown in FIG. 3, the driving assembly D14 and the optical module 4990 does not overlap each other in a direction that is perpendicular to the main axis O14 to achieve miniaturization. It should be noted that the interaction between the first magnetic element 4411 and the second magnetic element 4421 may create a magnetic force to move the optical module 4990 relative to the fixed portion F14, so auto focus (AF) or optical image stabilization (OIS) may be achieved.

Furthermore, the circuit board 4601 may be, for example, a flexible printed circuit, which may be affixed on the fixed portion F14 by adhesion. In some embodiments, the circuit board 4601 is electrically connected to other electronic elements disposed inside or outside the optical element driving mechanism 4101. For example, the circuit board 4601 may send electric signal to the driving assembly D14 to control the movement of the movable portion 4301. In some embodiments, the circuit board 4601 may position between the base 4211 and the movable portion 4301 in Z direction. In some embodiments, the circuit board 4601 may include magnetic permeable material to increase the electromagnetic force generated by the driving assembly D14.

In some embodiments, a position sensor 4431 may be disposed in the optical element driving mechanism 4101 to detect the position of the movable portion 4301 relative to the fixed portion F14. The position sensor 43431 may include Hall sensor, magnetoresistance effect sensor (MR Sensor), giant magnetoresistance effect sensor (GMR sensor), tunneling magnetoresistance effect sensor (TMR sensor), or fluxgate sensor. For example, a plurality of convex portions 4211F may be positioned on the base 4211 (FIG. 6), the position sensor 4431 may be positioned between two convex portions 4211F, and the second magnetic element 4421 may surround the two convex portions 4211F and the position sensor 4431 to protect the position sensor 4431.

The support element 4700 may have a spherical shape for connecting the movable portion 4301 and the fixed portion F14 to allow the movable portion 4301 may be moved relative to the fixed portion F14 through the support element 4700. In detail, the movable portion 4301 includes a recess 4301A, the base 4211 includes a convex portion 4211A extending to the movable portion 4301, and a concave portion 4211B positioned in the convex portion 4211A. The support element 4700 is partially disposed in the recess 4301A of the movable portion 4301 and the concave portion 4211B of the base 4211 to limit the position of the support element 4700. As shown in FIG. 3, the recess 4301A and the concave portion 4211B has half-spherical shapes, so the spherical support element 4700 may roll in the recess 4301A and the concave portion 4211B, and the friction between the movable portion 4301 and the fixed portion F14 may be reduced. As a result, the movable portion 4301 may rotate relative to the fixed portion F14. In some embodiments, the material of the support element 4700 may include ceramic or resin to prevent magnetic interference from occurring between the support element 4700 and the driving assembly D14. Furthermore, the minimum distance G24 between the concave portion 4211A and the movable portion 4301 is less than the distance DM4 of the support element 4700 along the main axis O14, so the support element 4700 may be prevented from falling out from the recess 4301A of the movable portion 4301 and the concave portion 4211B of the base 4211 when the movable portion 4301 moving relative to the fixed portion F14.

As shown in FIG. 3, the distance between the second magnetic element 4421 and the movable portion 4301 is G14, the distance between the convex portion 4211A and a bottom surface 4301B of the movable portion 4301 is G24, and the distance G14 is less than the distance G24. As a result, the electromagnetic force between the first magnetic element 4411 disposed on the movable portion 4301 and the second magnetic element 4421 disposed on the base 4211. Furthermore, the base 4211 includes a top surface 4211C and a bottom surface 4211D, the distance G34 between the top surface 4211C and the movable portion 4301 may be less than the distance G44 between the bottom surface 4211D and the movable portion 4301, and the minimum distance G54 between the resilient element 4810 and the bottom surface 4211D may be less than the distance G44 between the bottom surface 4211D and the movable portion 4301. As a result, the size of the optical element driving mechanism 4101 along the main axis O14 may be reduced to achieve miniaturization.

Figure 4:
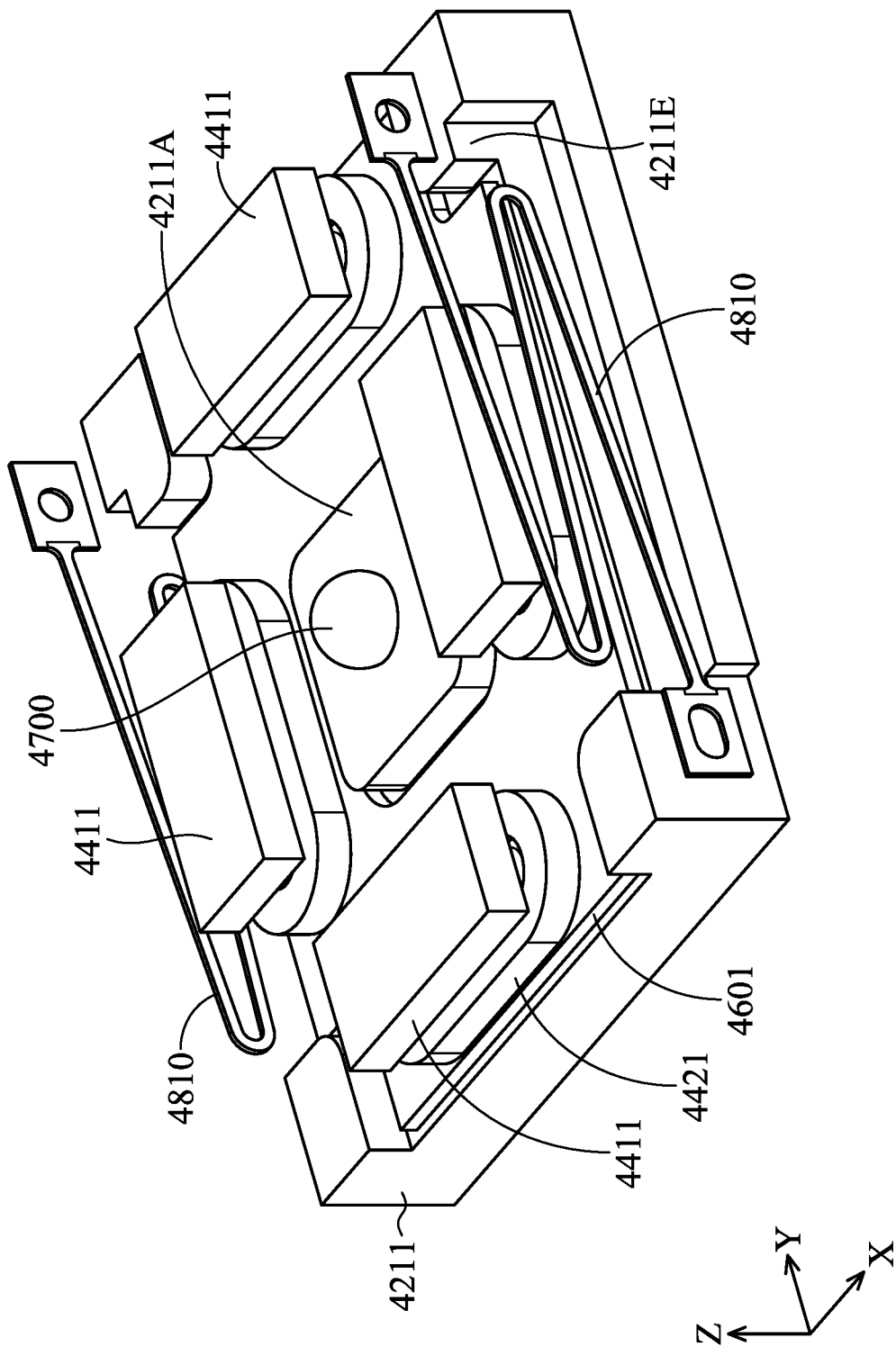
FIG. 4 is a schematic view of some elements of the optical element driving mechanism.
Figure 5:
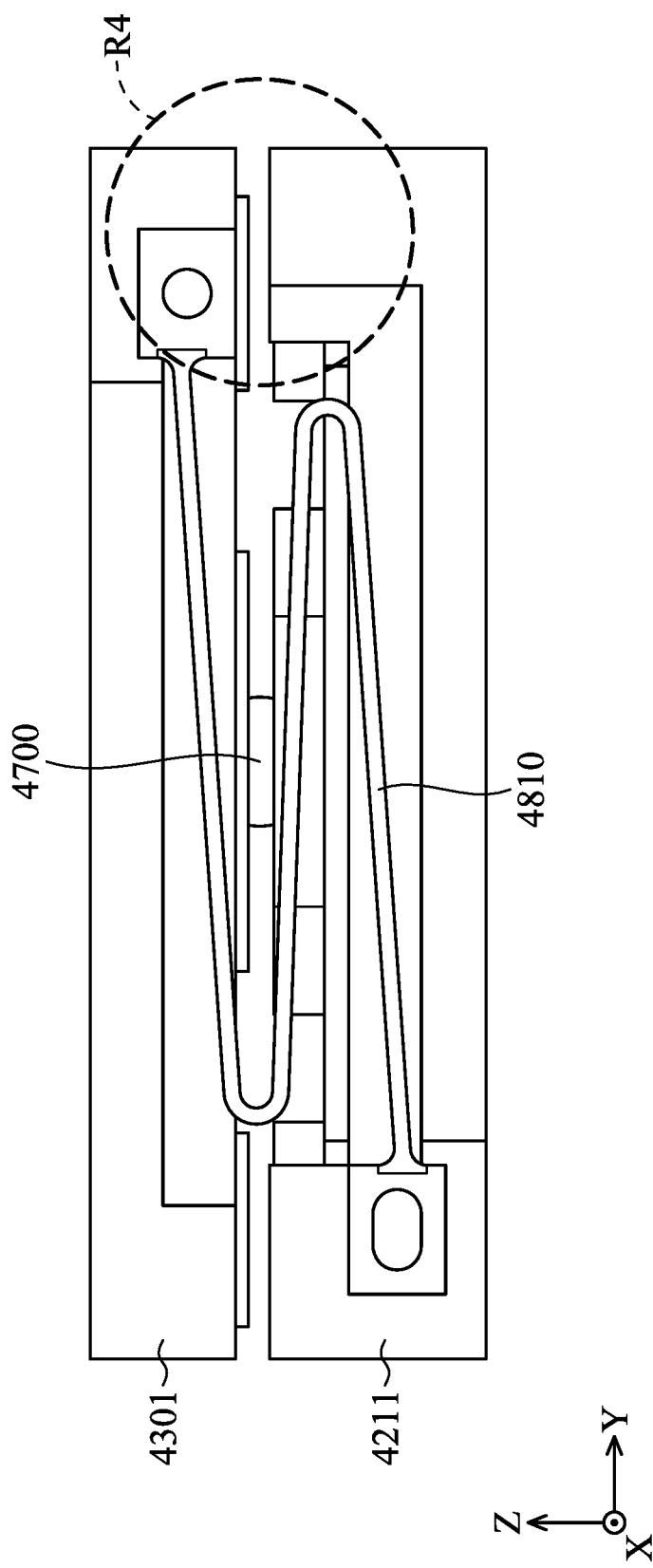
FIG. 5 is a side view of the optical element driving mechanism.

The resilient elements 4810 may be disposed on the sides of the optical element driving mechanism 4101, such as disposed on opposite sides of the optical element driving mechanism 4101, and the main axis O14 is positioned between two resilient elements 4810. Furthermore, the resilient elements 4810 may be disposed on a plane that is perpendicular to the main axis O14. Furthermore, the resilient element 4810 may be S-shaped. The resilient element 4810 may connect the fixed portion F14 (the base 4211) and the movable portion 4301 to restrict the movable range of the movable portion 4301 relative to the fixed portion F14. Moreover, as shown in FIG. 3, FIG. 4, and FIG. 5, the base 4211 may has a recess 4211E at its side, and the resilient element 4810 may be partially disposed in the recess 4211E to protect the resilient element 4810 from being damaged. The resilient elements 4810 does not overlap the driving assembly D14 when viewed along the main axis O14, so the size of the optical element driving mechanism 4101 in Z axis may be reduced.

As shown in FIG. 3, the magnetic permeable element 4801 may be disposed in the base 4211—for example, it may be embedded in the base 4211—and is not exposed from the base 4211. The magnetic permeable element 4801, the first magnetic element 4411 and the second magnetic element 4421 may at least partially overlap each other along the main axis O14, and the material of the magnetic permeable element 4801 may include metal. As a result, the magnetic field of the first magnetic element 4411 and the second magnetic element 4421 may be adjusted, and miniaturization may be achieved. Furthermore, a magnetic force may be generated between the first magnetic element 4411 or the second magnetic element 4421 and the magnetic permeable element 4801, so the elements disposed between the first magnetic element 4411, the second magnetic element 4421 and the magnetic permeable element 4801 may be fixed.

Figure 6:
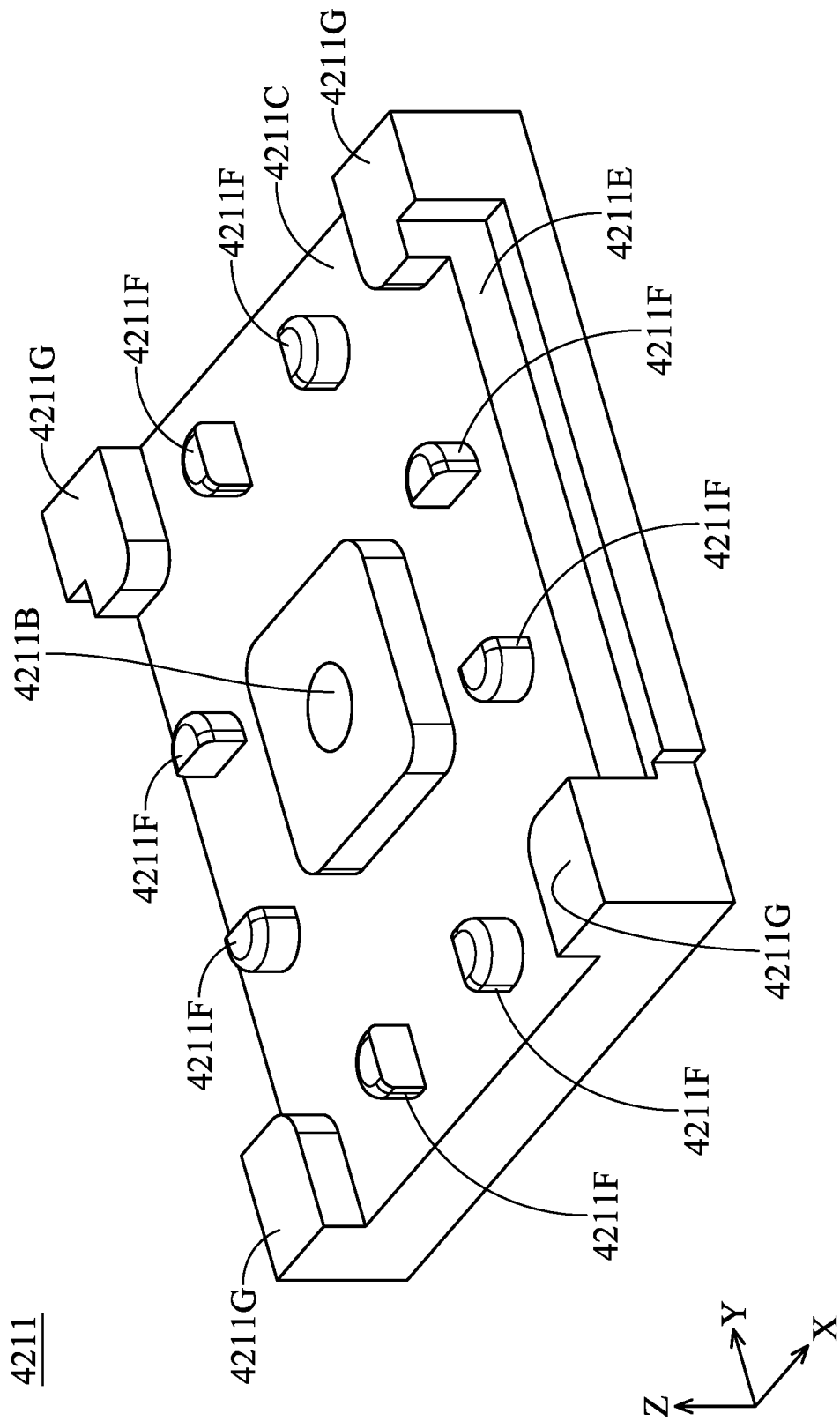
FIG. 6 is a schematic view of the base.

FIG. 6 is a schematic view of the base 4211. The base 4211 may include convex portions 4211F that extend pair by pair in Z direction. The second magnetic element 4421 may surround two convex portions 4211F, the position sensor 4431 may be positioned between two convex portions 4211F, and the second magnetic element 4421 may surround the position sensor 4431. Furthermore, the base 4211 may include stopping portions 4211G to limit the movable range of the movable portion 4301 relative to the base 4211. In some embodiments, the circuit may be provided in the base 4211—for example, it may be embedded in the base 4211 (not shown)—and it may be electrically connected to the driving assembly D14 to provide an electrical signal. In some embodiments, the stopping portions 4211G may be positioned at the corners of the base 4211 to further utilize the space at the corners. However, the present disclosure is not limited thereto. For example, stopping portions that extends to the movable portion 4301 may be disposed on the sides of the base 4211 (not shown).

Figure 7:
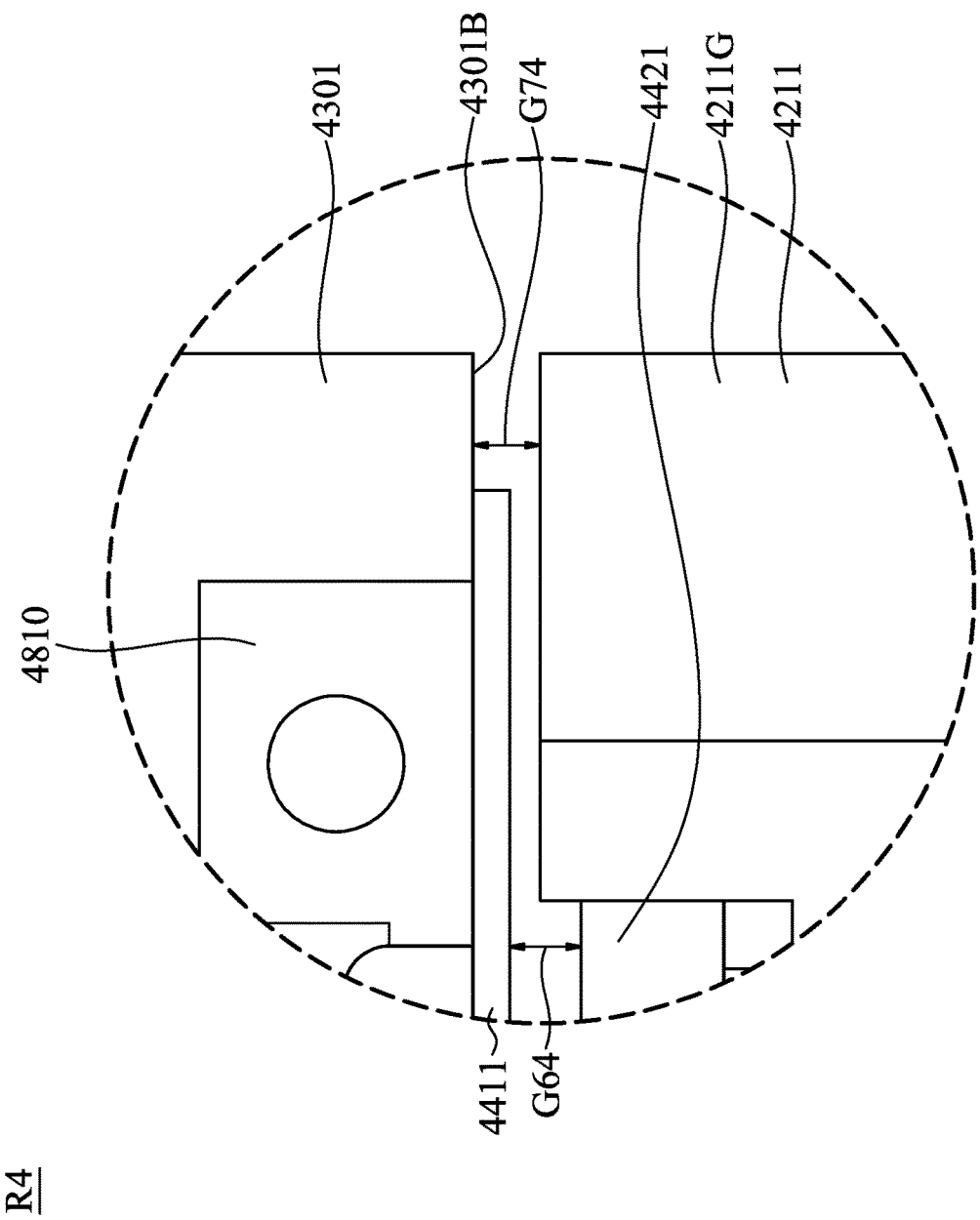
FIG. 7 is an enlarged view of the portion R4 in FIG. 5.

FIG. 7 is an enlarged view of the portion R4 in FIG. 5. As shown in FIG. 7, the distance G64 between the first magnetic element 4411 and the second magnetic element 4421 is greater than the distance G74 between the stopping portion 4211G and the movable portion 4301. As a result, the first magnetic element 4411 and the second magnetic element 4421 may be prevented from colliding with each other.

Figure 8:
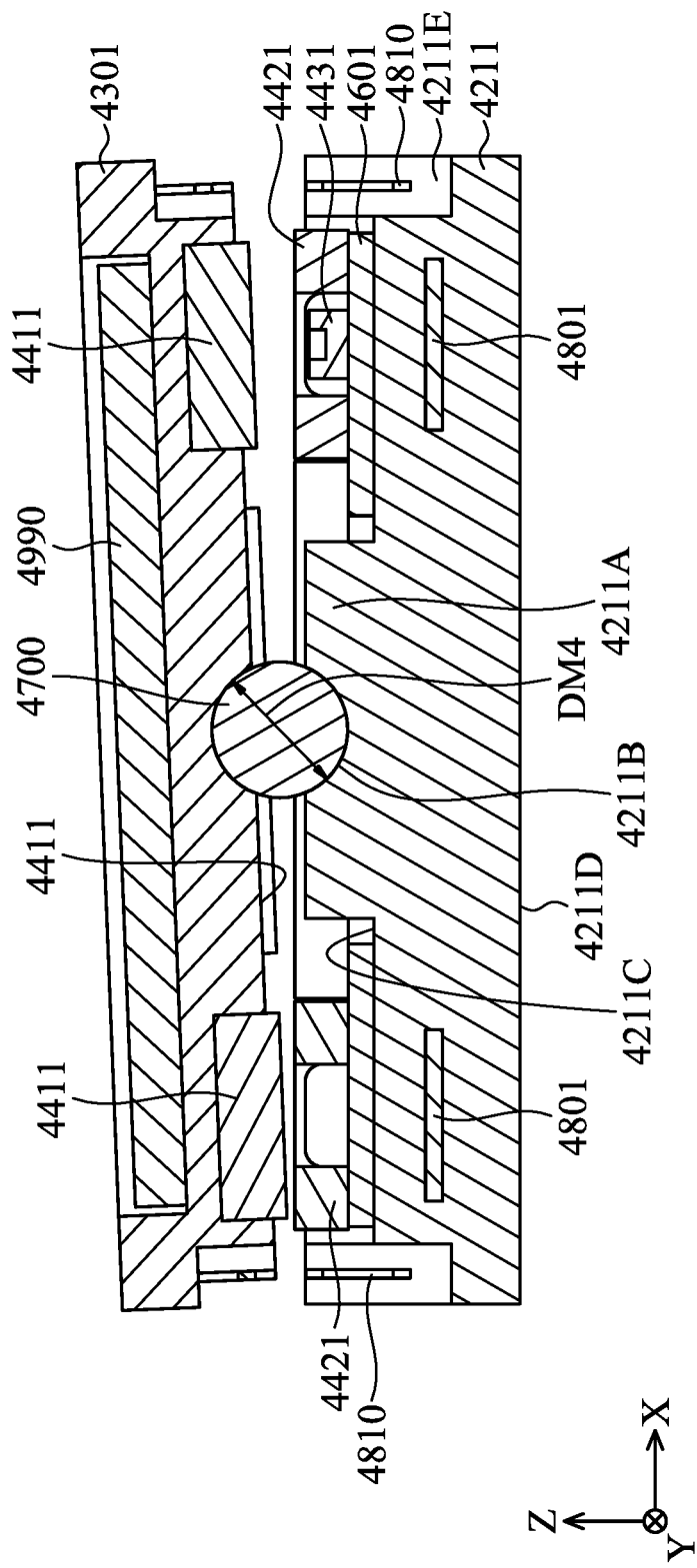
FIG. 8 is a schematic view when the optical element driving mechanism is operating.

FIG. 8 is a cross-sectional view of the movable portion 4301 of the optical element driving mechanism 4101 and other elements disposed on the movable portion 4301 when these elements rotate in Y axis relative to the fixed portion F14. As shown in FIG. 8, the movable portion 4301 and the optical module 4990 disposed on the movable portion 4301 may use the spherical support element 4700 as a fulcrum to rotate in different directions by the force generated from the driving assembly D14. Although the embodiment in FIG. 8 only shows the movable portion 4301 rotating in a single axis, but it should be noted that the movable portion 4301 may rotate in more than one axes, such as X, Y, and Z axes, to achieve optical image stabilization (OIS).

Although the second magnetic element 4421 in aforementioned embodiments surrounds the convex portions 4211F of the base 4211, the present disclosure is not limited thereto. For example, FIG. 9 to FIG. 12 are a schematic view, an exploded view of the optical element driving mechanism 4102 in another embodiments of the present disclosure, a cross-sectional view illustrated along the line B4-B4 in FIG. 9, and a side view of the optical element driving mechanism 4102, respectively. It should be noted that some elements are omitted in FIG. 9 for clarity.

Figure 10:
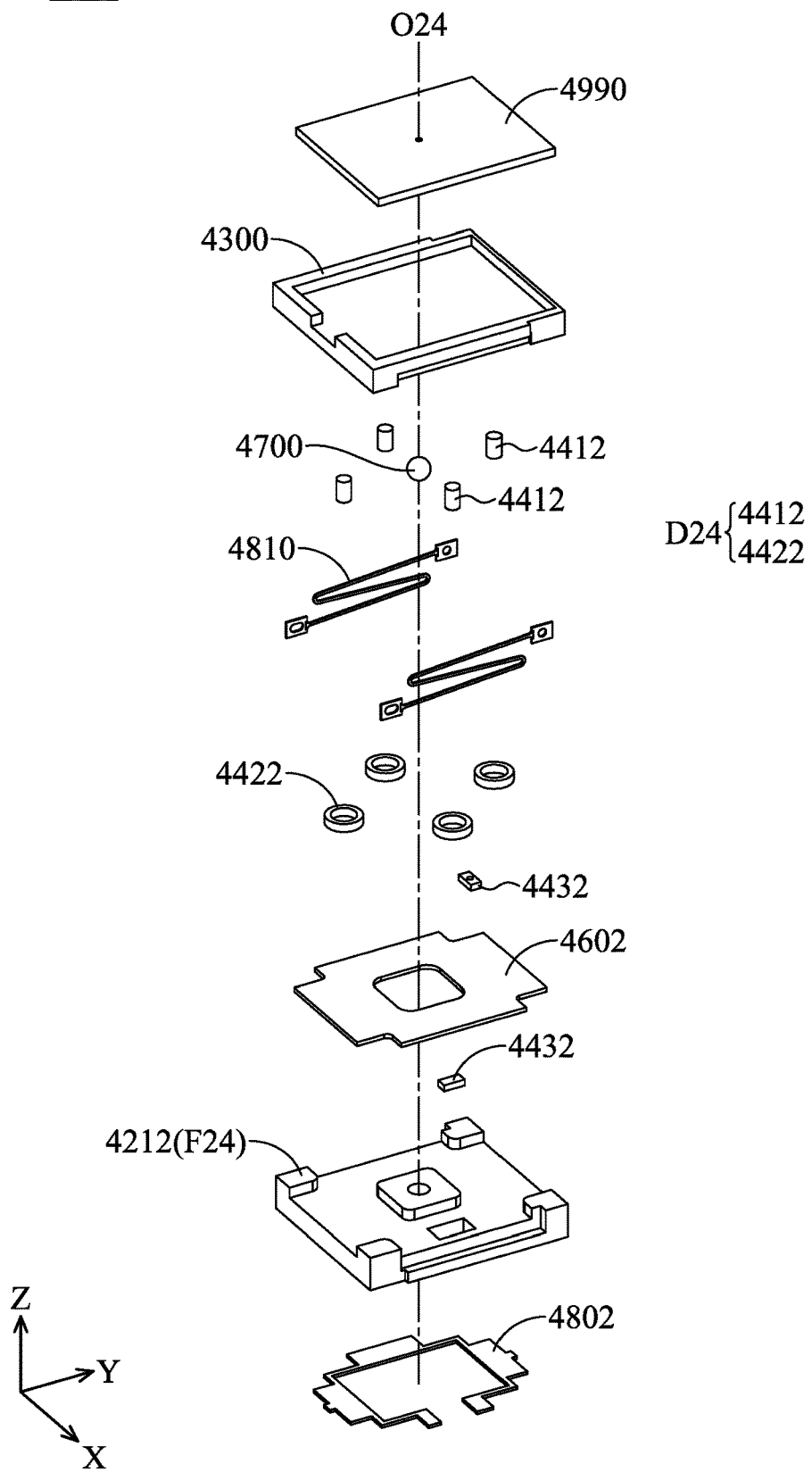
FIG. 10 is an exploded view of the optical element driving mechanism.

In FIG. 10, the optical element driving mechanism 4102 mainly includes a base 4212 (or called as a fixed portion F24), a movable portion 4302, a first magnetic element 4412 and a second magnetic element 4422 (may be called as a driving assembly D24), a position sensor 4432, a circuit board 4602, a support element 4700, a magnetic permeable element 4802, and a resilient element 4810. The optical element driving mechanism 4102 may be used to drive the optical module 4990 or other optical elements. Identical or similar elements are not described again.

Figure 9:
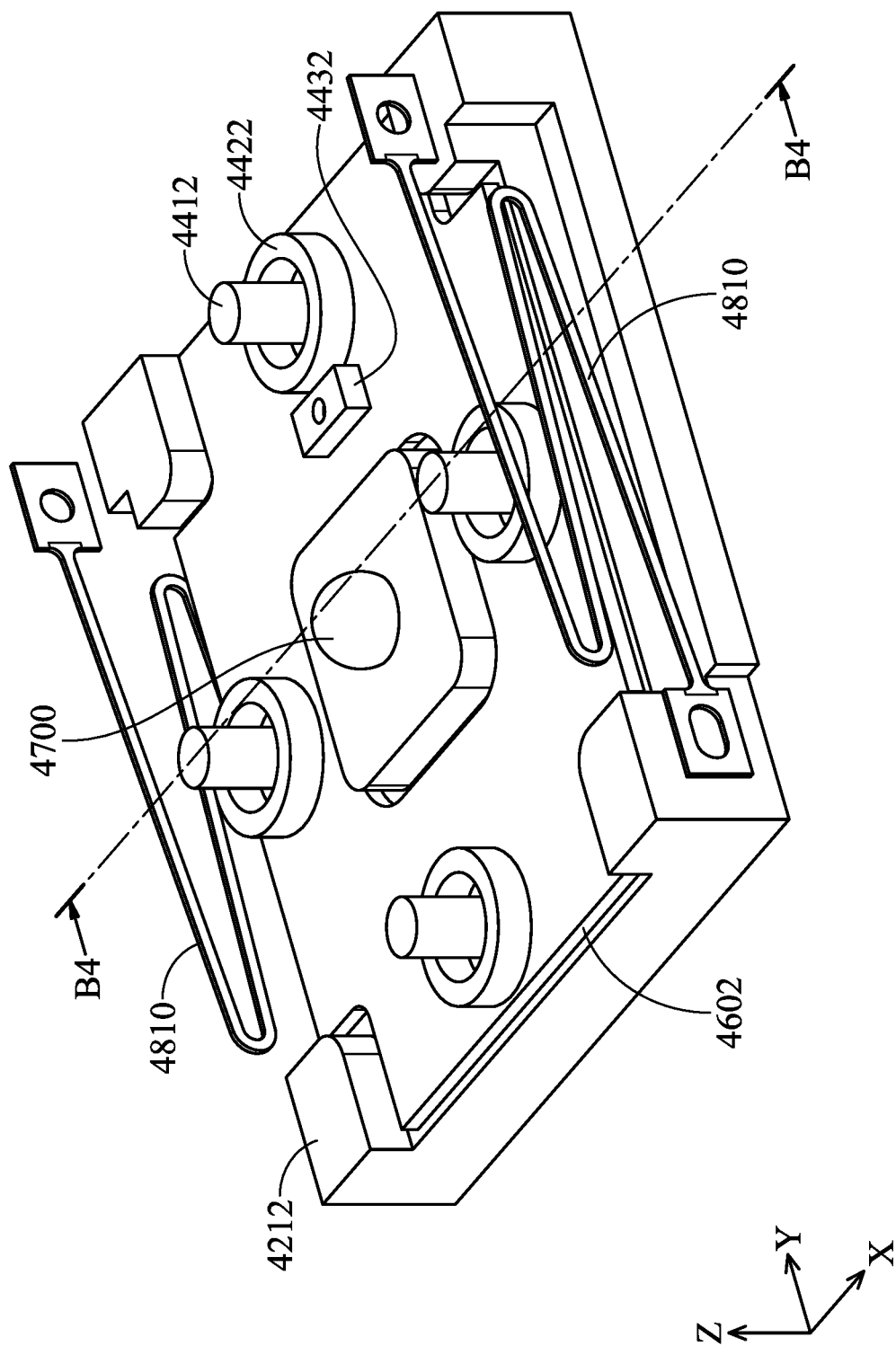
FIG. 9 is a schematic view of some elements of the optical element driving mechanism in some embodiments of the present disclosure.
Figure 11:
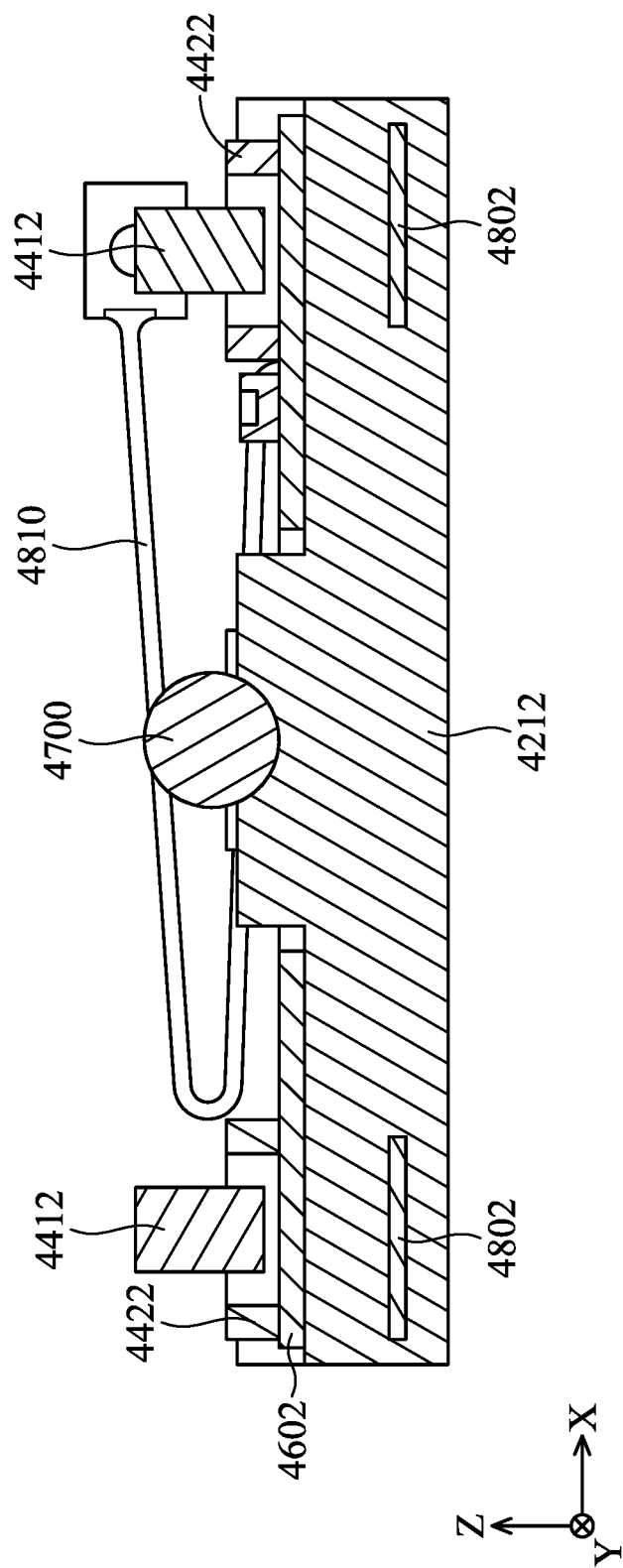
FIG. 11 is a cross-sectional view of the optical element driving mechanism.
Figure 12:
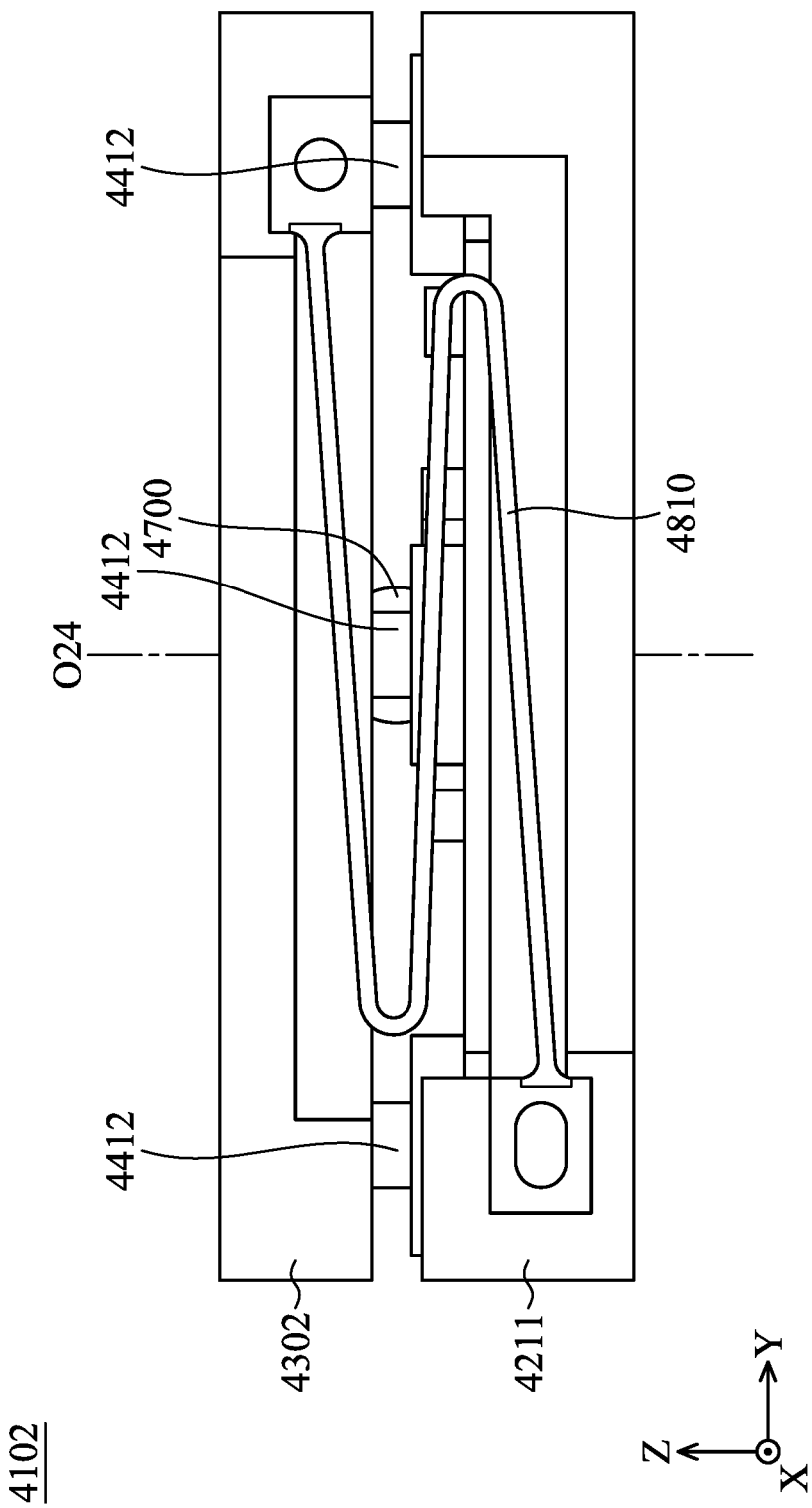
FIG. 12 is a side view of the optical element driving mechanism.

In this embodiment, as shown in FIG. 9 and FIG. 11, the first magnetic element 4412 may be disposed in the second magnetic element 4422. In other words, as shown in FIG. 12, the first magnetic element 4412 and the second magnetic element 4422 are at least partially overlap each other to reduce the required space in a direction that is perpendicular to the main axis O24. In some embodiments, the second magnetic element 4422 may be disposed on the circuit board 4602, and the first magnetic element 4412 may be disposed on the movable portion 4302 and may be separated from the circuit board 4602 by a distance. In some embodiments, the first magnetic element 4412 may be disposed in the movable portion 4302 to fix the first magnetic element 4412. In some embodiments, the positions of the first magnetic element 4412 and the second magnetic element 4422 may be interchanged. As a result, the electromagnetic force generated between the first magnetic element 4412 and the second magnetic element 4422 may drive the movable portion 4302 to move relative to the fixed portion F24.

Figure 13:
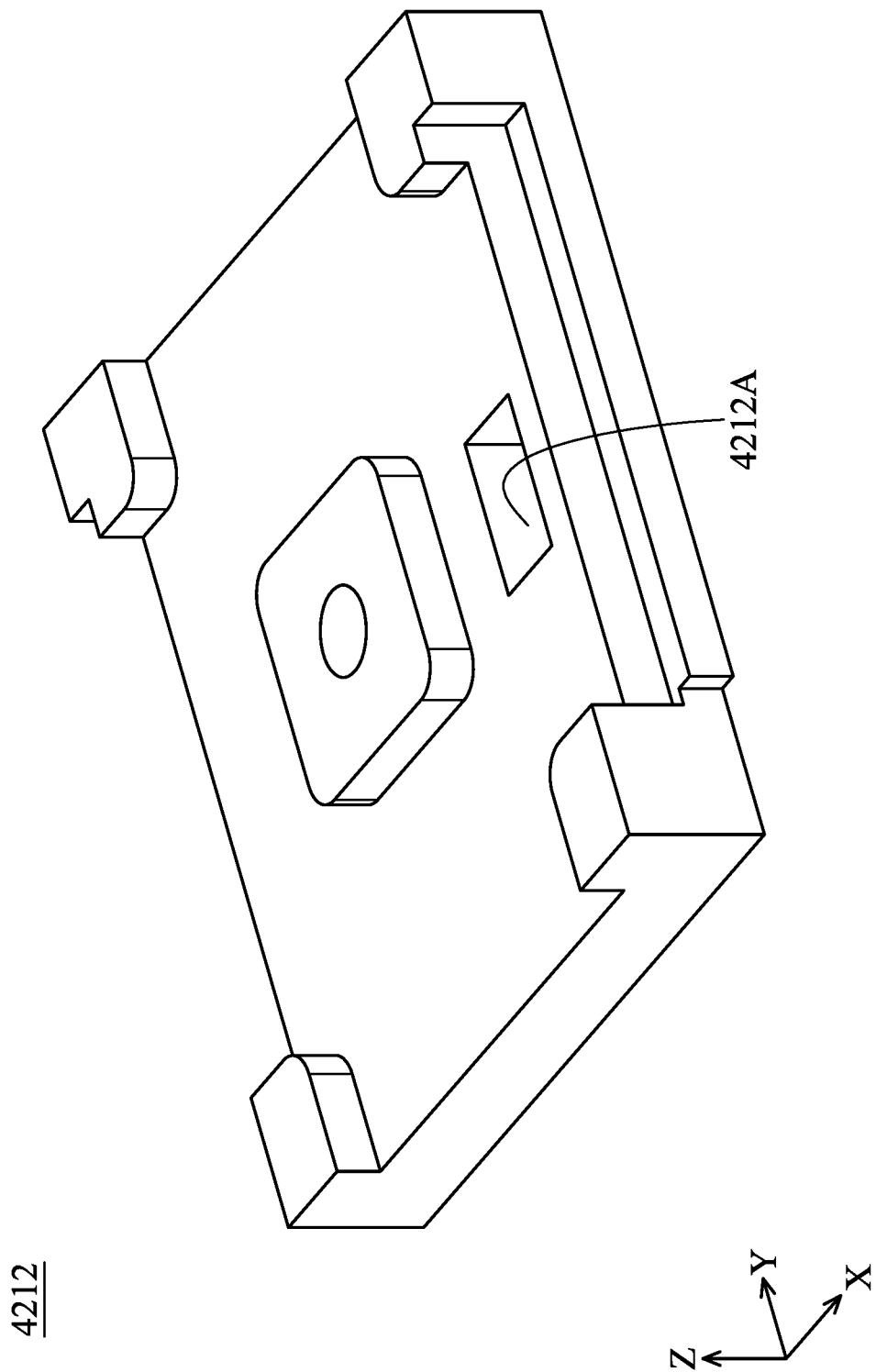
FIG. 13 is a schematic view of the base.
Figure 14:
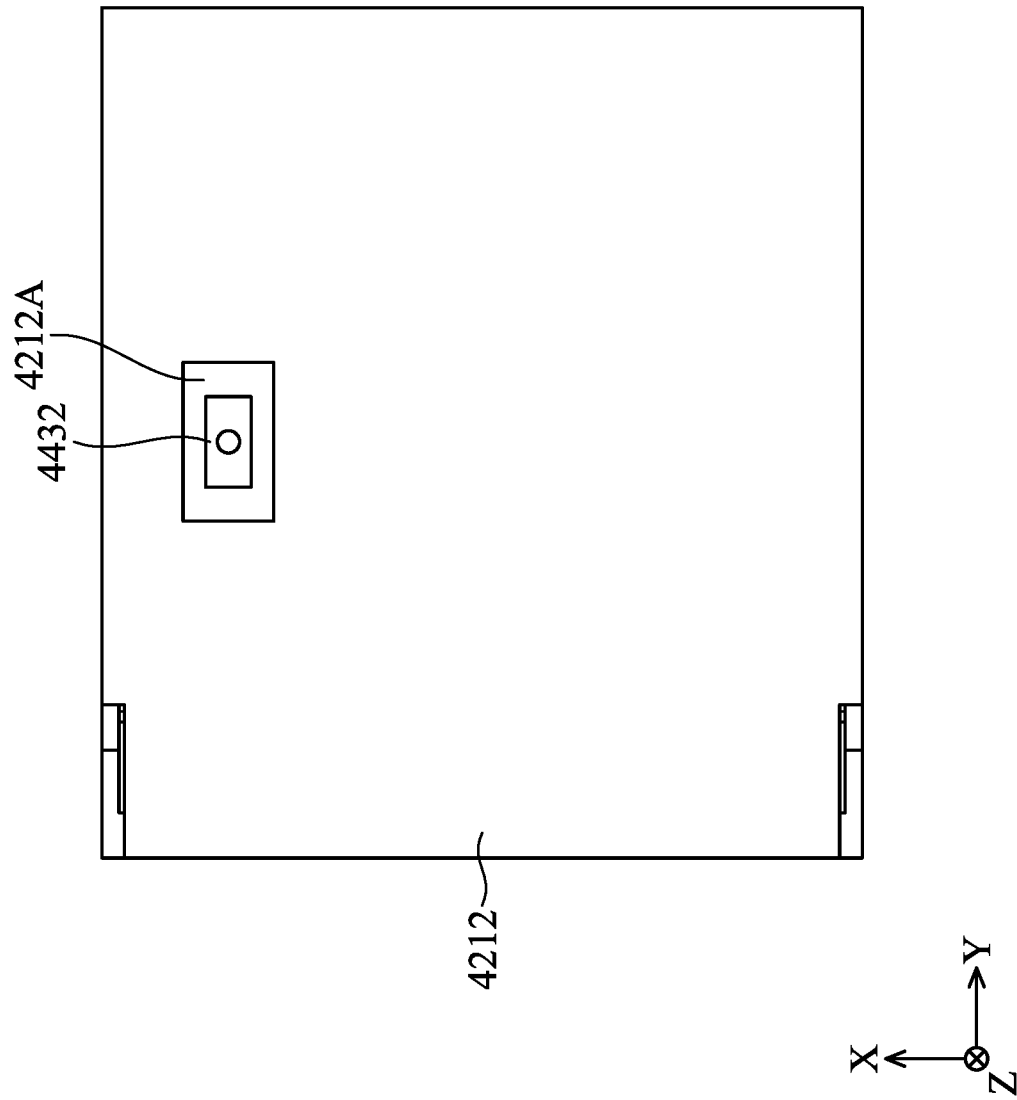
FIG. 14 is a bottom view of some elements of the optical element driving mechanism.

FIG. 13 is a schematic view of the base 4212, and FIG. 14 is a bottom view of the base 4212 and the position sensor 4432. An opening 4212A may be formed on the base 4212, and the position sensor 4432 may be positioned in the opening 4212A to protect the position sensor 4432 and achieving miniaturization. In other words, the position sensor 4432 and the driving assembly D24 may be disposed on the same side (FIG. 9) or they may be disposed on opposite sides (FIG. 14) of the circuit board 4602. Furthermore, the thickness of the position sensor 4432 may be less than the thickness of the base 4212 along the main axis O24, so the position sensor 4432 may be protected by the base 4212. In some embodiments, the opening 4212A may be replaced by a recess to increase the mechanical strength of the base 4212. In some embodiments, the first magnetic element 4412 or the second magnetic element 4422 may at least partially overlap the position sensor 4432 along the main axis O24 to detect the magnetic field variation of the first magnetic element 4412 or the second magnetic element 4422.

Figure 15:
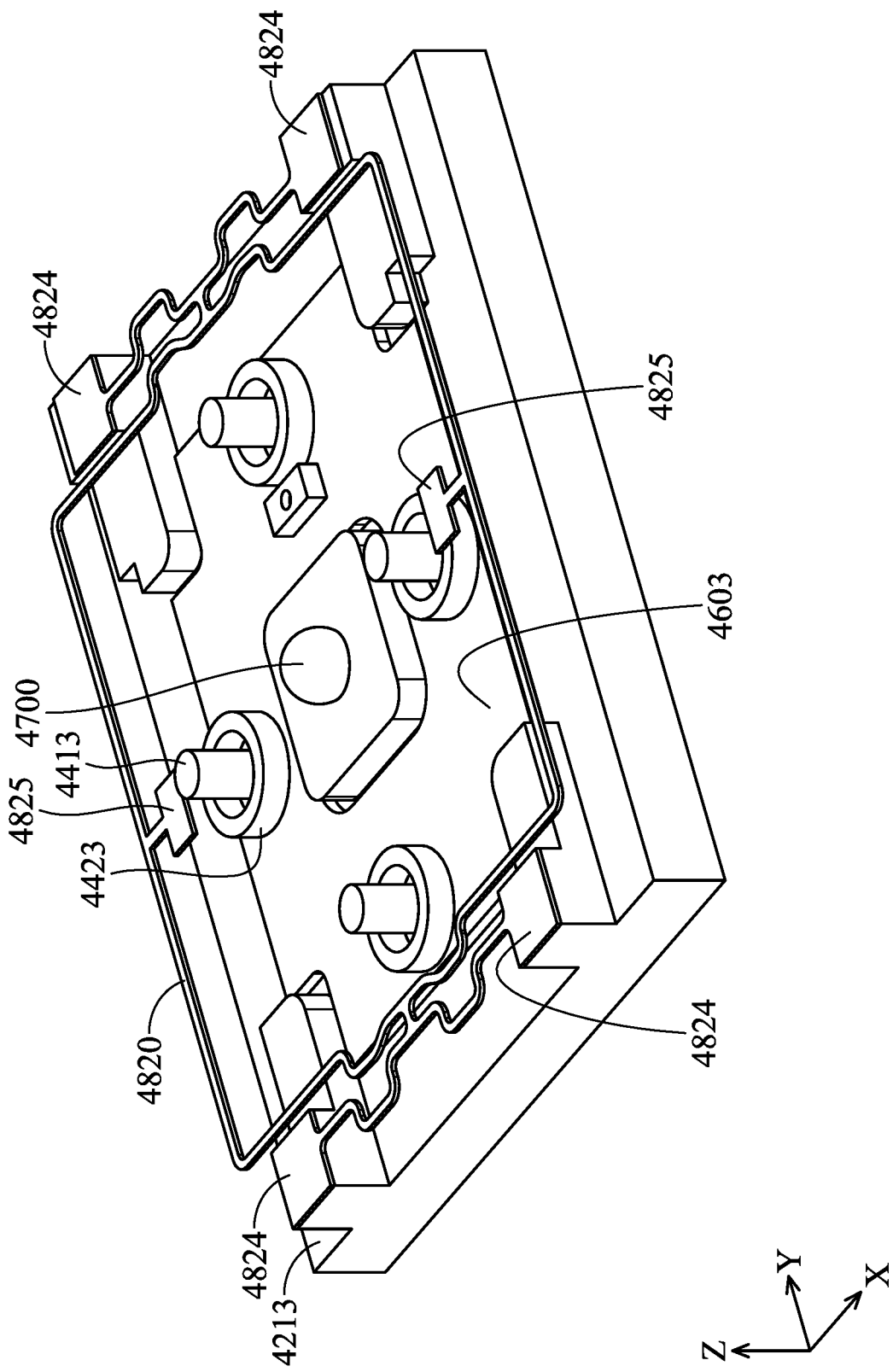
FIG. 15 is a schematic view of some elements of the optical element driving mechanism in some embodiments of the present disclosure.

In the aforementioned embodiments, the movable portion and the fixed portion are connected by the resilient elements 4810 disposed on the sides of the optical element driving mechanism, but the present disclosure is not limited thereto. For example, FIG. 15 to FIG. 15 are a schematic view, an exploded view, a cross-sectional view, and a side view of an optical element driving mechanism 4103, respectively. It should be noted that some elements are omitted in FIG. 15 for clarity.

Figure 16:
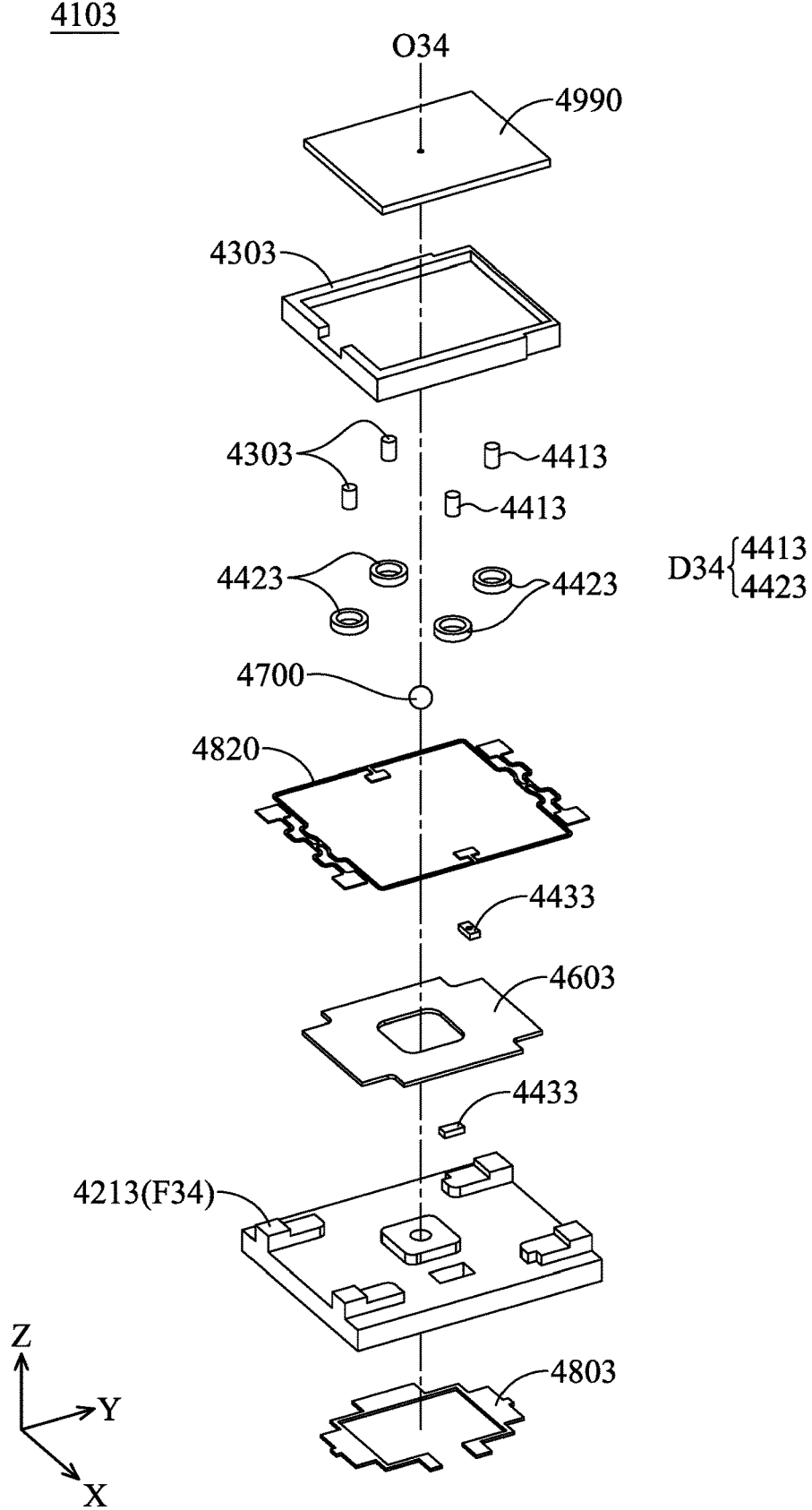
FIG. 16 is an exploded view of the optical element driving mechanism.
Figure 17:
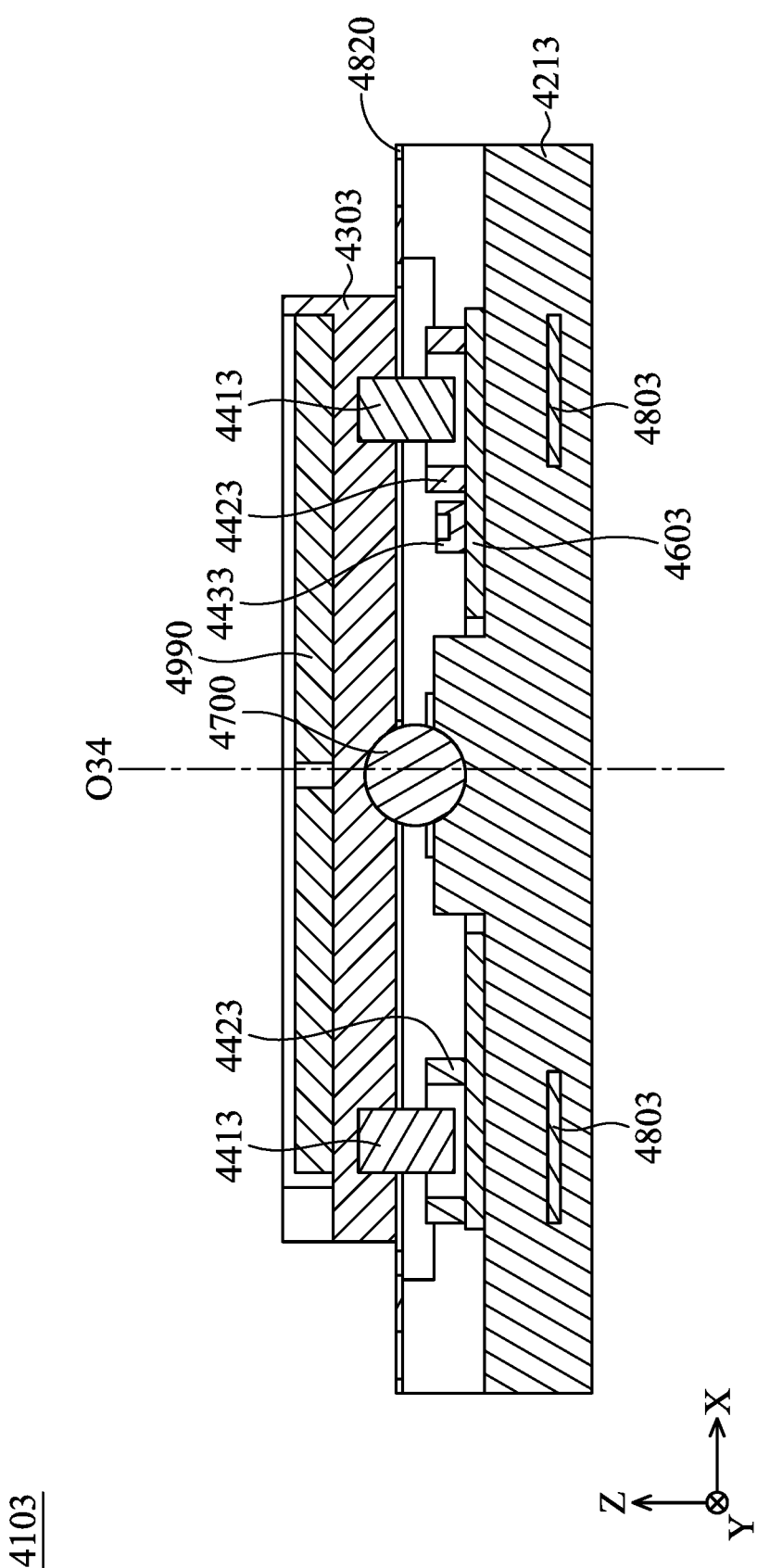
FIG. 17 is a cross-sectional view of the optical element driving mechanism.
Figure 18:
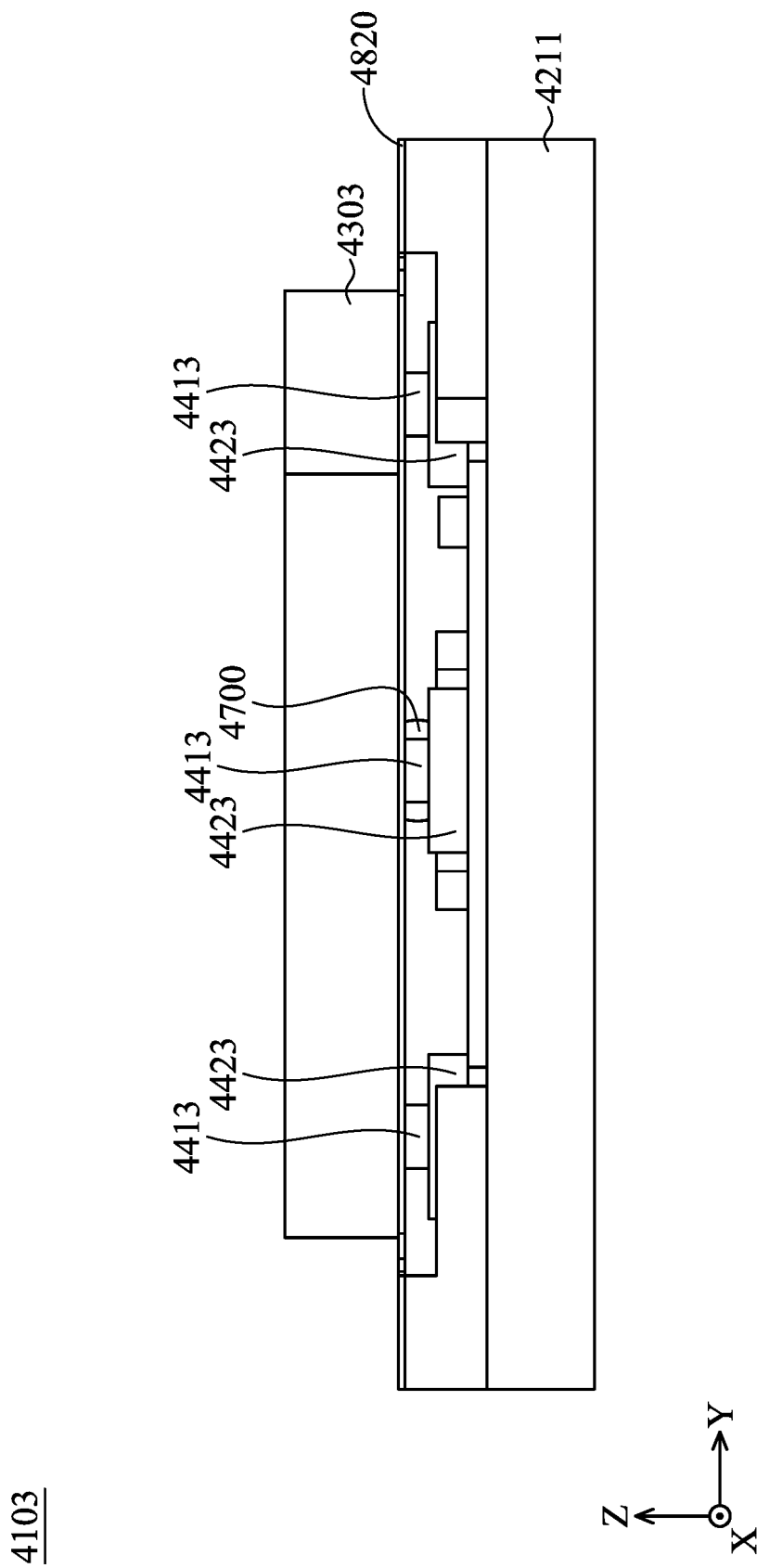
FIG. 18 is a side view of the optical element driving mechanism.

In FIG. 16, the optical element driving mechanism 4103 mainly includes a base 4213 (or called as a fixed portion F34), a movable portion 4303, a first magnetic element 4413 and a second magnetic element 4423 (may be called as a driving assembly D34), a position sensor 4433, a circuit board 4603, a support element 4700, a magnetic permeable element 4803, and a resilient element 4820. The optical element driving mechanism 4103 may be used to drive the optical module 4990 or other optical elements. Identical or similar elements are not described again.

Figure 19:
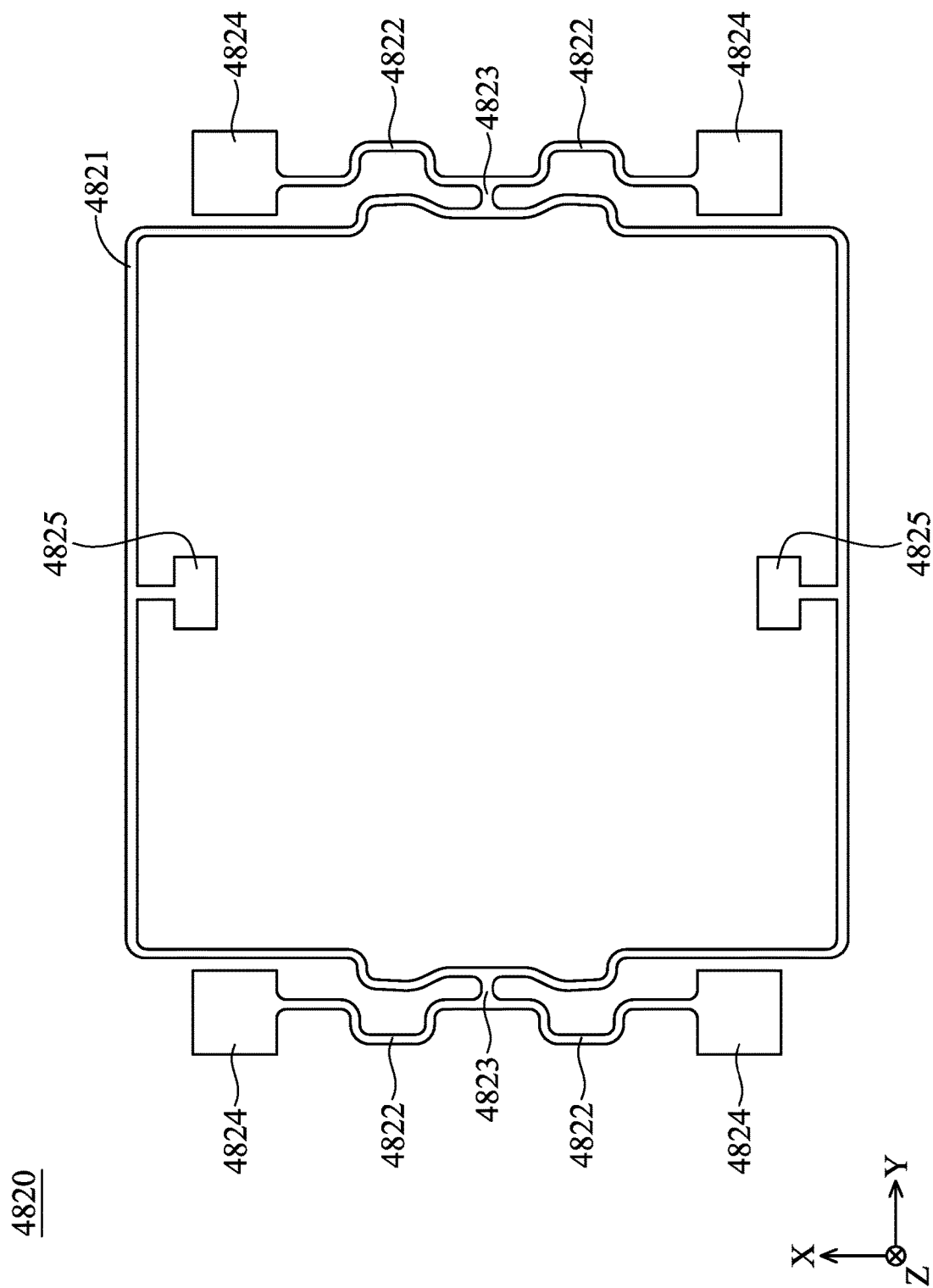
FIG. 19 is a schematic view of a resilient element.

In the optical element driving mechanism 4103, the movable portion 4303 and the fixed portion F34 are connected by the resilient element 4802 rather than the resilient element 4810 in previous embodiments. FIG. 19 is a schematic view of the resilient element 4820. The resilient element 4820 includes an inner portion 4821, an extension portion 4822, a connecting portion 4834 connecting the inner portion 4821 and the extension portion 4822, a contact portion 4824 positioned at an end of the extension portion 4822, and a contact portion 4825 positioned on the inner portion 4821. As shown in FIG. 15, the contact portion 4824 may be directly disposed on the base 4213 and connect to the base 4213, such as affixed on the base 4213 by gluing. The contact portion 4825 may be disposed on the movable portion 4303 (not shown in FIG. 15). As a result, the movable portion 4304 and the fixed portion F34 may be connected by a single resilient element 4820. In some embodiments, the circuit board 4303 and the resilient element 4820 may be disposed on different sides of the fixed portion F34 to reduce required space. In some embodiments, the resilient element 4820 is disposed on a plane having a normal vector that is parallel to the main axis O34.

It should be noted that the contact portion 4824 and/or the contact portion 4825 of the resilient element 4820 may be disposed on opposite sides of the optical element driving mechanism 4103 (opposite sides relative to the main axis O34) to balance the forces of the optical element driving mechanism 4103 in different directions. Furthermore, the contact portion 4824 and the contact portion 4825 may be positioned at different sides of the inner portion 4821. For example, as shown in FIG. 19, the contact portion 4824 is disposed on the outer side of the inner portion 4821, and the contact portion 4825 is disposed at the inner side of the inner portion 4821. However, the positions of the contact portion 4824 and the contact portion 4825 may be interchanged. As a result, required space may be reduced to achieve miniaturization. The resilient element 4820 may be disposed on a plate that is substantially perpendicular to the main axis O34. As a result, the rotation of the movable portion 4303 relative to the main axis O34 may be restricted.

Figure 20:
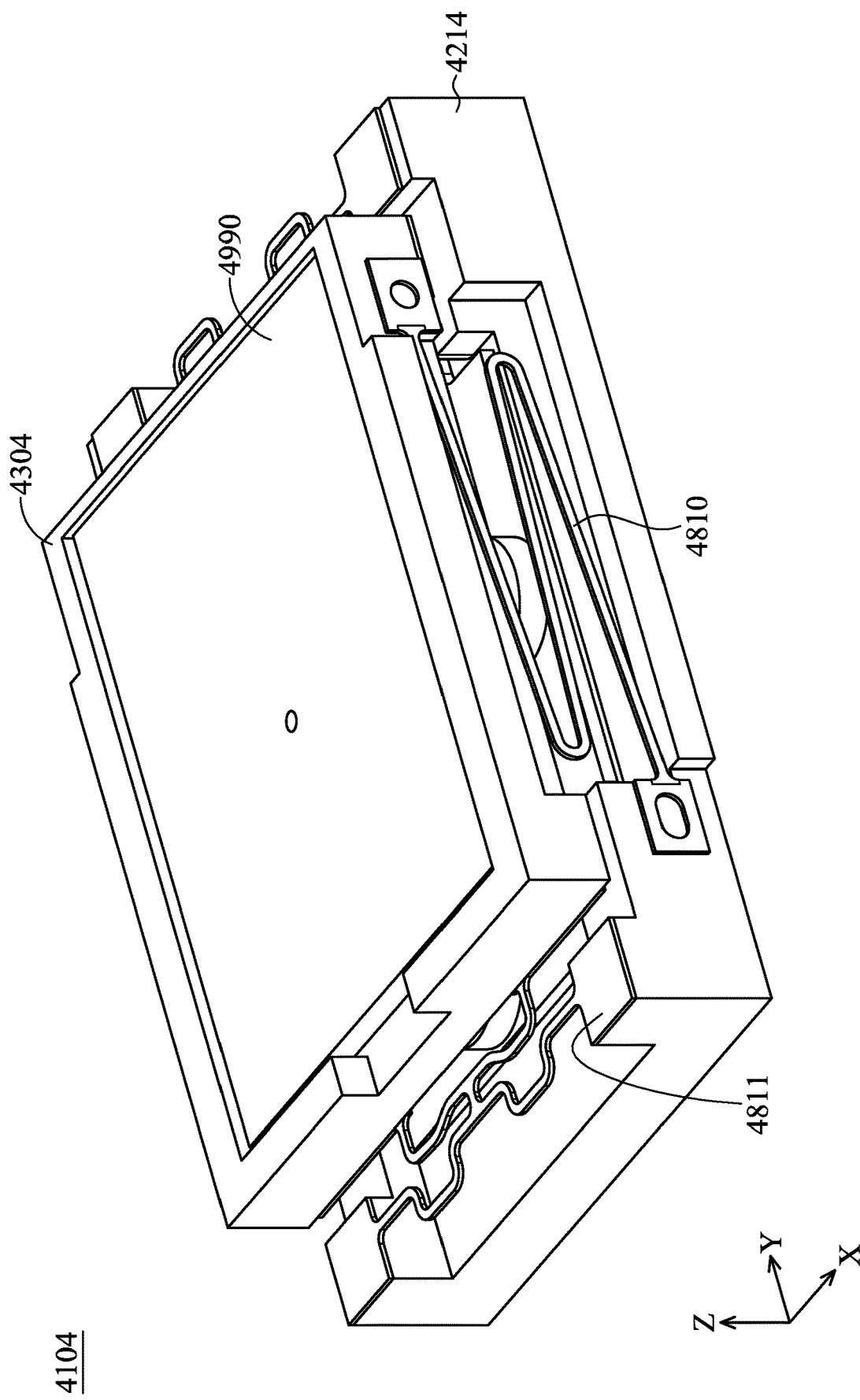
FIG. 20 is a schematic view of some elements of the optical element driving mechanism in some embodiments of the present disclosure.

In some embodiments, the resilient element 4810 and the resilient element that is disposed on the XY plane may be provided at the same time. For example, FIG. 20 to FIG. 22 are a schematic view, an exploded view, and a side view of an optical element driving mechanism 4104 in another embodiments of the present disclosure.

Figure 21:
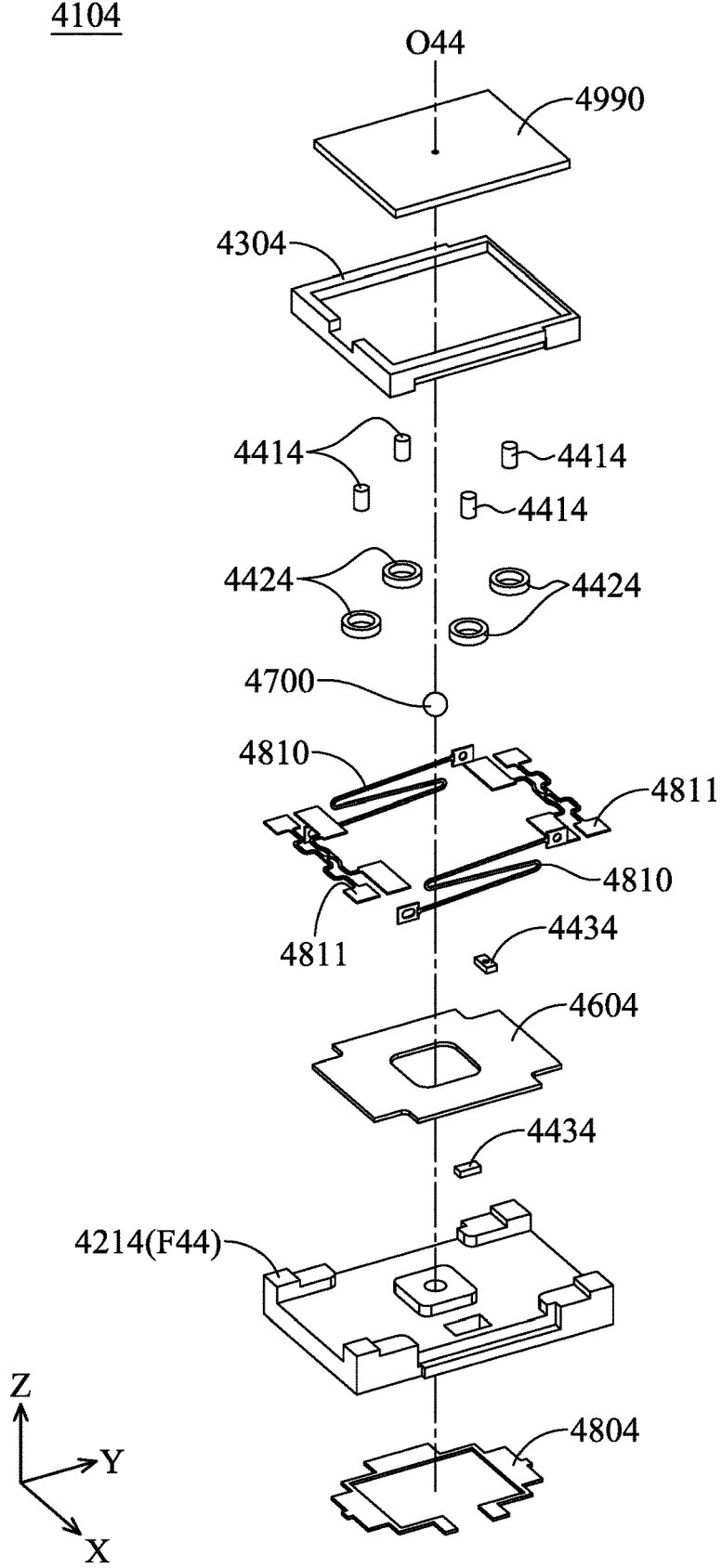
FIG. 21 is an exploded view of the optical element driving mechanism.

In FIG. 21, the optical element driving mechanism 4104 mainly includes a base 4214 (or called as a fixed portion F44), a movable portion 4304, a first magnetic element 4414 and a second magnetic element 4424 (may be called as a driving assembly D44), a position sensor 4434, a circuit board 4604, a support element 4700, a magnetic permeable element 4804, resilient elements 4810, and resilient elements 4811. The optical element driving mechanism 4104 may be used to drive the optical module 4990 or other optical elements. Identical or similar elements are not described again.

Figure 22:
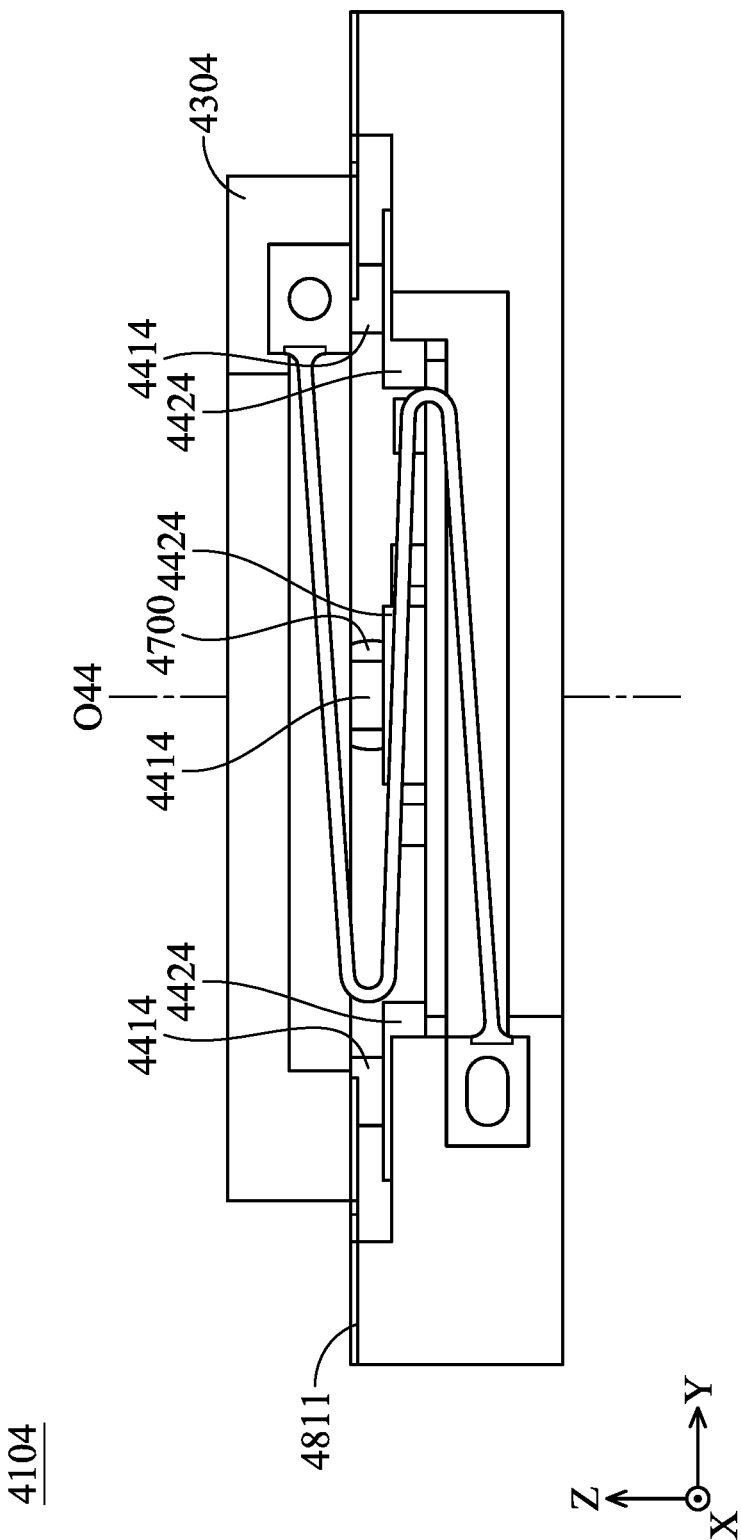
FIG. 22 is a side view of the optical element driving mechanism.

As shown in FIG. 22, the resilient elements 4810 and the resilient elements 4811 may connect to the movable portion 4304 and the fixed portion 4214, wherein the two resilient elements 4810 are disposed on two sides of the optical element driving mechanism 4104, and the resilient elements 4811 are disposed on another two sides of the optical element driving mechanism 4104. Furthermore, the resilient elements 4810 and the resilient elements 4811 are disposed on different sides of the optical element driving mechanism 4104. As a result, the maximum movable range of the movable portion 4304 indifferent directions relative to the fixed portion F44 may be restricted. The required space in a single side of the optical element driving mechanism 4104 may be reduced by letting the resilient elements 4810 and the resilient elements 4811 disposed on different sides of the optical element driving mechanism 4104, and miniaturization may be achieved.

Figure 23:
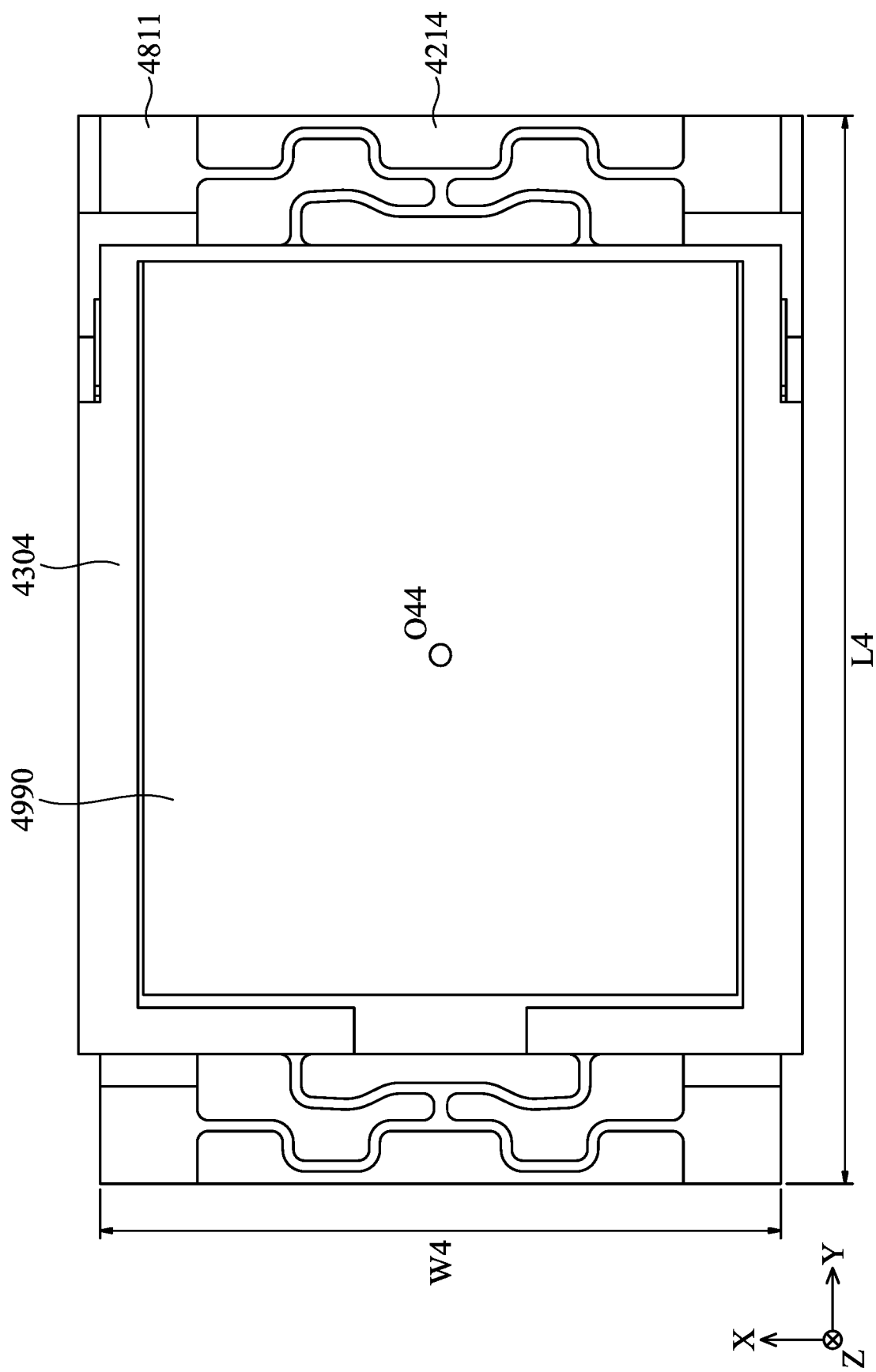
FIG. 23 is a top view of the optical element driving mechanism.

FIG. 23 is a top view of the optical element driving mechanism 4104. As shown in FIG. 23, the optical element driving mechanism 4104 has a rectangular shape, wherein the length is L4, the width is W4, and the length L4 is greater than the width W4. As a result, the size of the optical element driving mechanism 4104 in X axis may be reduced to achieve miniaturization.

In summary, an optical element driving mechanism is provided. The design of the present disclosure provides the optical element with additional directions of motion, so the performance of the optical module is improved, and miniaturization can be achieved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
   a movable portion for connecting to an optical element having a main axis;
   a fixed portion, wherein the movable portion is movable relative to the fixed portion;
   a driving assembly disposed on the fixed portion or the movable portion, used for driving the movable portion to move relative to the fixed portion, wherein the driving assembly comprises:
   a first magnetic element disposed on the movable portion; and
   a second magnetic element disposed on the fixed portion, wherein the first magnetic element and the second magnetic element at least partially overlap each other when viewed in a direction that is perpendicular to the main axis; and
   a support element, wherein the movable portion is connected to the fixed portion through the support element.

2. The optical element driving mechanism as claimed in claim 1, further comprising a circuit board, and the second magnetic element is disposed on the circuit board.

3. The optical element driving mechanism as claimed in claim 2, wherein the circuit board and the first magnetic element are separated from each other by a distance.

4. The optical element driving mechanism as claimed in claim 2, further comprising a position sensor, wherein the driving assembly and the position sensor are positioned on opposite sides of the circuit board.

5. The optical element driving mechanism as claimed in claim 4, wherein the fixed portion comprises a base, the base has an opening, and the position sensor is disposed in the opening.

6. The optical element driving mechanism as claimed in claim 5, wherein the thickness of the position sensor is less than the thickness of the base along the main axis.

7. The optical element driving mechanism as claimed in claim 2, wherein the circuit board comprises magnetic permeable material.

8. The optical element driving mechanism as claimed in claim 2, further comprising a resilient element, wherein the circuit board and the resilient element are disposed on different sides of the fixed portion.

9. The optical element driving mechanism as claimed in claim 8, wherein the resilient element is positioned on a plane, and a normal vector of the plane is parallel to the main axis.

10. The optical element driving mechanism as claimed in claim 1, wherein the optical element driving mechanism has a rectangular shape, and the driving assembly is disposed at a side of the optical element driving mechanism.

11. The optical element driving mechanism as claimed in claim 10, wherein the fixed portion comprises:
   a base having a rectangular shape; and
   a stopping portion extending to the movable portion, and the stopping portion is positioned at a corner of the base or the side of the base.

12. The optical element driving mechanism as claimed in claim 1, wherein the optical element driving mechanism has a rectangular shape, and the driving assembly is disposed at a corner of the optical element driving mechanism.

13. The optical element driving mechanism as claimed in claim 12, wherein the fixed portion comprises:
   a base having a rectangular shape; and
   a stopping portion extending to the movable portion, wherein the stopping portion is positioned at the corner of the base or a side of the base.

14. An optical element driving mechanism, comprising:
   a movable portion for connecting to an optical element having a main axis;
   a fixed portion, wherein the movable portion is movable relative to the fixed portion;
   a driving assembly disposed on the fixed portion or the movable portion, used for driving the movable portion to move relative to the fixed portion;
   a support element, wherein the movable portion is connected to the fixed portion through the support element; and
   a magnetic permeable element, wherein the fixed portion comprises a base, and the magnetic permeable element is embedded in the base.

15. An optical element driving mechanism, comprising:
   a movable portion for connecting to an optical element having a main axis;
   a fixed portion, wherein the movable portion is movable relative to the fixed portion;
   a driving assembly disposed on the fixed portion or the movable portion, used for driving the movable portion to move relative to the fixed portion;
   a support element, wherein the movable portion is connected to the fixed portion through the support element; and
   a circuit electrically connected to the driving assembly, wherein the fixed portion comprises a base, and the circuit is embedded in the base.

16. An optical element driving mechanism, comprising:
   a movable portion for connecting to an optical element having a main axis;
   a fixed portion, wherein the movable portion is movable relative to the fixed portion;
   a driving assembly disposed on the fixed portion or the movable portion, used for driving the movable portion to move relative to the fixed portion; and
   a support element, wherein the movable portion is connected to the fixed portion through the support element,
   wherein the material of the support element comprises ceramic or resin.

17. An optical element driving mechanism, comprising:
   a movable portion for connecting to an optical element having a main axis;
   a fixed portion, wherein the movable portion is movable relative to the fixed portion;
   a driving assembly disposed on the fixed portion or the movable portion, used for driving the movable portion to move relative to the fixed portion; and
   a support element, wherein the movable portion is connected to the fixed portion through the support element,
   wherein the fixed portion comprises a base, the base comprises a convex portion extending to the movable portion, the support element has a spherical shape, and a minimum distance between the convex portion and the fixed portion along the main axis is less than the diameter of the support element.

18. An optical element driving mechanism, comprising:
   a movable portion for connecting to an optical element having a main axis;
   a fixed portion, wherein the movable portion is movable relative to the fixed portion, and the fixed portion comprises:
      a base having a rectangular shape; and
      a stopping portion extending to the movable portion, wherein the stopping portion is positioned at a corner of the base;
   a driving assembly disposed on the fixed portion or the movable portion, used for driving the movable portion to move relative to the fixed portion, wherein the driving assembly comprises a first magnetic element and a second magnetic element, wherein a minimum distance between the stopping portion and the movable portion is less than a minimum distance between the first magnetic element and the second magnetic element along the main axis; and
   a support element, wherein the movable portion is connected to the fixed portion through the support element.

* * * * *